US009667672B2

(12) United States Patent
Chen et al.

(10) Patent No.: US 9,667,672 B2
(45) Date of Patent: May 30, 2017

(54) METHOD, CLIENT, SERVER AND SYSTEM FOR MULTI-PERSON AUDIO-VIDEO INTERACTION

(71) Applicant: Guang-Zhou Huaduo Network Technology Co., Ltd., Tianhe Guangzhou, Guangdong (CN)

(72) Inventors: Zhou Chen, Guangdong (CN); Yang Zhou, Guangdong (CN); Yuping Li, Guangdong (CN); Bowen Li, Guangdong (CN); Yanmei Wang, Guangdong (CN); Jie Chen, Guangdong (CN)

(73) Assignee: GUANG-ZHOU HUADUO NETWORK TECHNOLOGY CO., LTD., Gaungdong (CN)

( * ) Notice: Subject to any disclaimer, the term of this patent is extended or adjusted under 35 U.S.C. 154(b) by 0 days.

(21) Appl. No.: 14/782,352

(22) PCT Filed: Apr. 9, 2014

(86) PCT No.: PCT/CN2014/074961
§ 371 (c)(1),
(2) Date: Oct. 5, 2015

(87) PCT Pub. No.: WO2014/166383
PCT Pub. Date: Oct. 16, 2014

(65) Prior Publication Data
US 2016/0057175 A1 Feb. 25, 2016

(30) Foreign Application Priority Data
Apr. 9, 2013 (CN) .......................... 2013 1 0122227

(51) Int. Cl.
H04N 7/14 (2006.01)
H04L 29/06 (2006.01)
(Continued)

(52) U.S. Cl.
CPC ...... H04L 65/1069 (2013.01); G06F 3/04883 (2013.01); H04L 12/1813 (2013.01);
(Continued)

(58) Field of Classification Search
CPC .......... H04N 7/15; H04N 7/147; H04N 7/152; H04N 7/142; H04N 7/157; H04N 7/141
(Continued)

(56) References Cited

U.S. PATENT DOCUMENTS

2010/0322111 A1* 12/2010 Li ............................ A63F 13/12
370/260
2011/0254914 A1* 10/2011 Ng .................... H04N 21/42202
348/14.16
(Continued)

FOREIGN PATENT DOCUMENTS

| CN | 101646057 A | 2/2010 |
|---|---|---|
| CN | 102006453 A | 4/2011 |
| CN | 102244759 A | 11/2011 |

*Primary Examiner* — Quoc D Tran
(74) *Attorney, Agent, or Firm* — Young Basile Hanlon & MacFarlane, P.C.

(57) ABSTRACT

A method, client, server and system for multi-person audio-video interaction are disclosed in the present invention, which belong to the field of internet terminal. The method includes: obtaining channel configuration information corresponding to current channel from a server; loading a scene module corresponding to the current channel according to the obtained channel configuration information and pre-stored configuration information; obtaining and displaying pictures or videos corresponding to the current channel from the server; displaying the text information by a simulation object corresponding to the client in a user interaction region of the scene module; and sending the text information to the server, when the text information that triggered by the user in the user interaction region of the scene module is received. The present invention achieves that every simula-
(Continued)

tion object can be used to display the text information in different space position of the user interaction region, thus making an audience realize well communication and interaction effect in a scene environment simulated by a virtual scene.

20 Claims, 8 Drawing Sheets

(51) Int. Cl.

| | |
|---|---|
| H04N 21/234 | (2011.01) |
| H04N 21/44 | (2011.01) |
| H04N 21/488 | (2011.01) |
| H04N 21/81 | (2011.01) |
| G06F 3/0488 | (2013.01) |
| H04L 12/58 | (2006.01) |
| H04N 7/15 | (2006.01) |
| H04N 21/4223 | (2011.01) |
| H04N 21/4788 | (2011.01) |
| H04L 12/18 | (2006.01) |
| H04M 3/56 | (2006.01) |

(52) U.S. Cl.
CPC ........ *H04L 51/046* (2013.01); *H04L 65/1089* (2013.01); *H04L 65/403* (2013.01); *H04L 65/4053* (2013.01); *H04M 3/567* (2013.01); *H04N 7/147* (2013.01); *H04N 7/15* (2013.01); *H04N 7/157* (2013.01); *H04N 21/23412* (2013.01); *H04N 21/4223* (2013.01); *H04N 21/44012* (2013.01); *H04N 21/4788* (2013.01); *H04N 21/488* (2013.01); *H04N 21/8146* (2013.01)

(58) Field of Classification Search
USPC ..................... 348/14.01, 14.03, 14.08, 14.1
See application file for complete search history.

(56) References Cited

U.S. PATENT DOCUMENTS

2012/0098919 A1*  4/2012  Tang .................... H04N 7/148
                                                                 348/14.03
2012/0281059 A1*  11/2012  Chou .................... H04N 7/15
                                                                 348/14.07

* cited by examiner

METHOD, CLIENT, SERVER AND SYSTEM FOR MULTI-PERSON AUDIO-VIDEO INTERACTION

CROSS-REFERENCE TO RELATED APPLICATIONS

This present application claims the benefit of priority to Chinese Patent Application NO. 201310122227.9 filed in Chinese Patent Office on Apr. 9, 2013 and entitled "METHOD, CLIENT, SERVER AND SYSTEM FOR MULTI-PERSON AUDIO-VIDEO INTERACTION", the content of which is hereby incorporated by reference in its entirety for all intended purposes.

FIELD OF THE INVENTION

The present invention relates to the field of Internet terminal, and more particularly, to a method, client, server and system for multi-person audio-video interaction.

BACKGROUND

A team voice communication platform is a kind of network tool that provides multi-person online voice communication and video communication, which has been widely used for multi-person voice conference, multi-person video conference, online education, online entertainment, online music, live online or other fields. The team voice communication platform commonly includes at least one client and at least one server.

Taking the application of the team voice communication platform in the field of live online as an example, the existing method for multi-person video-video interaction includes: a client used by a host and a client used by an audience being in the same channel and the client used by the host uploading videos collected by a camera in real-time to a server; the server displaying the videos to the client used by the audience after receiving the videos. If there are two or more than two audience, because the team voice communication platform can provide text chat function between different persons, so that different audiences can chat with each other by means of the text chat function provided by the team voice communication platform.

In the process of implementing the above mentioned method, at least the following problems exist in the existing method: the existing method for multi-person audio-video interaction is just a simple combination of live video and text chat, and the interaction between the host and the audience and the interaction between the audiences is mainly accomplished by means of the text chat. However, since chatting records of the text chat are showed one by one according to time sequence, so that, in the case of many audiences, the speech of an audience will soon be overwhelmed by the speech of other audiences, that is, the speech of an audience will soon be ignored or unseen by other audiences, thereby which cannot realize good communication and interaction effect between the host and the audience or between the audiences.

SUMMARY

To solve the problem that text chat of an audience may be soon overwhelmed by the speech of other audiences so as to result in failing to realizing well communication and interaction in the process of live video by means of a team voice communication platform, the present disclosure provides a method, client, server and system for multi-person audio-video interaction, which can make an audience realize well communication and interaction effect.

According to a first aspect of the present disclosure, a method for multi-person audio-video interaction applied to a terminal of a team voice communication platform, the method, includes:

obtaining channel configuration information corresponding to current channel from a server;

loading a scene module corresponding to the current channel according to obtained channel configuration information and pre-stored configuration information; wherein, the scene module includes a virtual scene, a video display region and a user interaction region; the video display region and the user interaction region are located in the virtual scene, and the user interaction region includes at least one simulation object, and each simulation object corresponds to one client in the current channel;

obtaining pictures or videos corresponding to the current channel from the server, and displaying the pictures or the videos by a video display region of the scene module;

displaying text information by a simulation object corresponding to the client in the user interaction region of the scene module, when the text information of a client is received from the server; and sending the text information to the server so as to forward the text information to at least one client in the current channel by the server, when the text information that is triggered by the user in the user interaction region of the scene module is received.

Preferably, the channel configuration information includes: first information used to represent whether to load the scene module or not; second information used to represent a version number of the scene module that needs be loaded; and third information used to represent subboards that need to be loaded and content data that each subboard needs; the step of loading a scene module corresponding to the current channel according to obtained channel configuration information and pre-stored configuration information, includes:

detecting whether the first information represents loading the scene module or not;

loading the virtual scene in the scene module corresponding to the version number according to the second information and the pre-stored configuration information, if it is detected that the first information represents loading the scene module; and loading a subboard used for displaying the video display region according to the third information, and loading at least one subboard used for displaying the user interaction region according to the third information; wherein, the at least one subboard includes a subboard used for displaying the simulation object in the user interaction region.

Preferably, before the step of loading the virtual scene in the scene module corresponding to the version number according to the second information and the pre-stored configuration information, the method further includes:

detecting whether configuration information and the scene module corresponding to the version number are stored according to the second information;

sending an acquisition request to the server if it is detected that the configuration information and the scene module corresponding to the version number are not stored; wherein, the acquisition request is used for acquiring the configuration information and the scene module corresponding to the version number in the second information; and receiving and storing the configuration information and the scene module used for acquiring a corresponding version number sent by the server.

Preferably, the user interaction region further includes at least one of: show information, a subscription list, a contribution list, a gift region, a vehicle region and a sharing list; the step of loading at least one subboard used for displaying the user interaction region according to the third information, includes:

loading a subboard used for displaying the show information in the user interaction region if the third information includes configuration about the show information;

loading a subboard used for displaying the subscription list in the user interaction region if the third information includes configuration about the subscription list;

loading a subboard used for displaying the contribution list in the user interaction region if the third information includes configuration of the subscription list;

loading a subboard used for displaying gift animations in the user interaction region if the third information includes configuration about the gift region;

loading a subboard used for displaying vehicles in the user interaction region if the third information includes configuration about vehicle information; and loading a subboard used for displaying the sharing list in the user interaction region if the third information includes configuration about the sharing list.

Preferably, after the step of loading a subboard used for displaying vehicles in the user interaction region if the third information includes configuration about vehicle information, the method further includes:

displaying vehicle displaying animations corresponding to the client in the user interaction region by use of the subboard used for displaying the vehicles in the user interaction region, when receives vehicle displaying information corresponding to a client sent by the server.

Preferably, after the step of loading a subboard used for displaying gift animations in the user interaction region if the third information includes configuration about the gift region, the method further includes:

displaying gift animations corresponding to the client in the user interaction region by means of a subboard used for displaying gift animations in the user interaction region, when receives gift giving information corresponding to a client sent by the server.

Preferably, after the step of loading a subboard used for displaying the video display region according to the third information, the method further includes:

sending videos to the server by use of the subboard used for displaying the video display region so as to send the videos to at least one client in the current channel by the server, if the third information includes video uploading permission information; wherein, the video uploading permission information is located in content data corresponding to the subboard used for displaying the video display region in the third information.

Preferably, the simulation object includes at least one of a client picture, a client nickname and a client level, and is a display object with a certain shape; the step of displaying text information by a simulation object corresponding to the client in the user interaction region of the scene module, includes:

displaying the text information, in the form of text box or animation, by the simulation object corresponding to the client in the user interaction region; and continuing to display the text information for a predetermined time.

According to a second aspect of the present disclosure, a method for multi-person audio-video interaction applied to a server of a team voice communication platform, the method, includes:

sending channel configuration information corresponding to current channel to at least one client in the current channel, so as to load a scene module corresponding to the current channel according to obtained channel configuration information and pre-stored configuration information by the client; wherein, the scene module includes a virtual scene, a video display region and a user interaction region; the video display region and the user interaction region are located in the virtual scene, and the user interaction region includes at least one simulation object, and each simulation object corresponds to one client in the current channel;

sending pictures or videos corresponding to the current channel to the at least one client in the current channel, so as to display the pictures or the videos by the video display region of the scene module by the at least one client;

receiving text information sent by a client in the current channel; and sending the text information sent by the client to the at least one client in the current channel to make the at least one client in the current channel display the text information by a simulation object corresponding to the client in the user interaction region of the scene module.

the step of sending channel configuration information corresponding to current channel to at least one client in the current channel, the method includes:

receiving request information sent by at least one client that has logined, wherein, the request information is used to enter the current channel; and sending channel configuration information corresponding to the current channel to the client, after receiving the request information; wherein, the channel configuration information includes: first information used to represent whether to load a scene module or not; second information used to represent a version number of the scene module that needs be loaded; and third information used to represent subboards that need to be loaded and content data that each subboard needs.

after the step of sending channel configuration information corresponding to the current channel to the client, after receiving the request information, the method further includes:

receiving an acquisition request sent by the client; the acquisition request used for acquiring the configuration information and the scene module corresponding to a version number in the second information; and sending the configuration information and the scene module corresponding to the version number to the client.

the step of sending pictures or videos corresponding to the current channel to the at least one client in the current channel, includes:

detecting whether the client having the video uploading permission information of the at least one client in the current channel is uploading the video or not;

if the client having the video uploading permission information in the at least one client in the current channel is uploading the video, sending the video to the at least one client in the current channel, so as to display the video by the video display region of the scene module by the at least one client; and if the client having the video uploading permission information in the at least one client in the current channel does not upload the video, sending the pictures corresponding to the current channel to the at least one client in the current channel so as to display the pictures by the video display region of the scene module by the at least one client.

after the step of sending the channel configuration information corresponding to the current channel to the client if the third information includes configuration of vehicle information, the method further includes:

detecting whether the client corresponds to a vehicle or not, when a client enters into the current channel; and sending vehicle displaying information corresponding to the client to the at least one client in the current channel so as to display vehicle displaying animations corresponding to the client in the user interaction region by means of a subboard used for displaying the vehicle in the user interaction region by the at least one client in the current channel, if the client corresponds to a vehicle.

After the step of sending the channel configuration information corresponding to the current channel to the client if the third information includes configuration of gift region, the method further includes:

receiving gift giving information sent by a client in the current channel; and forwarding the gift giving information sent by the client to the at least one client in the current channel so as to display gift animations corresponding to the client in the user interaction region by means of a subboard used for displaying gift animations in the user interaction region by the at least one client.

According to a third aspect of the present disclosure, a client, applied to a team voice communication platform, the client includes:

an information acquisition module, configured for obtaining channel configuration information corresponding to current channel from a server;

a scene loading module, configured for loading a scene module corresponding to the current channel according to the channel configuration information obtained by the information acquisition module and pre-stored configuration information; wherein, the scene module includes a virtual scene, a video display region and a user interaction region, and the video display region and the user interaction region are located in the virtual scene; the user interaction region includes at least one simulation object, and each simulation object corresponds to one client in the current channel;

a media display module, configured for obtaining pictures or videos corresponding to the current channel from the server and displaying the pictures or the videos by a video display region of the scene module loaded by the scene loading module;

a text display module, configured for displaying text information by a simulation object corresponding to the client in the user interaction region of the scene module loaded by the scene loading module, when the text information of a client is received from the server; and a text sending module, configured for sending the text information to the server so as to forward the text information to at least one client in the current channel by the server, when the text information that is triggered by the user in the user interaction region of the scene module loaded by the scene loading module is received.

The channel configuration information includes: first information used to represent whether to load the scene module or not; second information used to represent a version number of the scene module that needs to be loaded; and third information used to represent subboards that need to be loaded and content data that each subboard needs; the scene module includes:

an information detection unit, configured for detecting whether the first information represents loading the scene module or not;

a scene loading unit, configured for loading the virtual scene in the scene module corresponding to the version number according to the second information and the pre-stored configuration information, if the information detection unit detects that the first information represents loading the scene module; and a subboard loading unit, configured for loading a subboard used for displaying the video display region and at least one subboard used for displaying the user interaction region according to the third information if the information detection unit detects that the first information represents loading the scene module; wherein, the at least one subboard includes a subboard used for displaying the simulation object in the user interaction region.

The scene module further includes:

a scene detection unit, configured for detecting whether configuration information and the scene module corresponding to a version number are stored according to the second information;

a request sending unit, configured for sending an acquisition request to the server if the scene detection unit detects that the configuration information and the scene module corresponding to a version number are not stored; wherein, the acquisition request is used for acquiring the configuration information and the scene module corresponding to a version number in the second information; and a scene acquisition unit, configured for receiving and storing the configuration information and the scene module used for acquiring a corresponding version number sent by the server.

The user interaction region further includes at least one of: show information, a subscription list, a contribution list, a gift region, a vehicle region and a sharing list; the subboard loading unit is configured for:

loading a subboard used for displaying the show information in the user interaction region if the third information includes the configuration about the show information;

loading a subboard used for displaying the show information in the user interaction region if the third information includes the configuration about the show information;

loading a subboard used for displaying the contribution list in the user interaction region if the third information includes the configuration of the subscription list;

loading a subboard used for displaying gift animations in the user interaction region if the third information includes the configuration about the gift region;

loading a subboard used for displaying vehicles in the user interaction region if the third information includes the configuration about vehicle information; and loading a subboard used for displaying a sharing list in the user interaction region if the third information includes the configuration about the sharing list.

The client further includes an animation displaying module, wherein, the animation displaying module is configured for, when receives vehicle displaying information corresponding to a client sent from the server, displaying vehicle displaying animations corresponding to the client in the user interaction region by use of the subboard used for displaying the vehicles in the user interaction region.

The client further includes: a gift animation module, wherein, the gift animation module is configured for displaying gift animations corresponding to the client in the user interaction region by means of a subboard used for displaying gift animations in the user interaction region, when receives gift giving information corresponding to a client sent from the server.

The client further includes a video uploading module, wherein, the video uploading module is configured for sending videos to the server by use of the subboard used for displaying the video display region so as to send the videos to the at least one client in the current channel by the server, if the third information includes video uploading permission information; wherein, the video uploading permission information is located in content data corresponding to the subboard used for displaying the video display region in the third information.

The simulation object includes at least one of a client picture, a client nickname and a client level, and is a display object with a certain shape; the text display module is used for displaying the text information, in the form of text box or animation, by the simulation object corresponding to the client in the user interaction region and continuing to display the text information for a predetermined time.

According to a fourth aspect of the present disclosure, a server, applied to a team voice communication platform, includes:

an information sending module, configured for sending channel configuration information corresponding to current channel to at least one client in the current channel so as to load a scene module corresponding to the current channel according to obtained channel configuration information and pre-stored configuration information by the client; wherein, the scene module includes a virtual scene, a video display region and a user interaction region; the video display region and the user interaction region are located in the virtual scene, and the user interaction region includes at least one simulation object, and each simulation object corresponds to one client in the current channel;

a media sending module, configured for sending pictures or videos corresponding to the current channel to the at least one client in the current channel so as to display the pictures or the videos by the video display region of the scene module by the at least one client;

a text receiving module, configured for receiving text information sent by a client in the current channel; and a text forwarding module, configured for sending the text information sent by the client to the at least one client in the current channel to make the at least one client in the current channel display the text information by a simulation object corresponding to the client in the user interaction region of the scene module.

The information sending module includes:

a request receiving unit, configured for receiving request information sent by at least one client that has logined, wherein, the request information is used to enter the current channel; and an information sending unit, configured for sending channel configuration information corresponding to the current channel to the client, after the request receiving unit receives the request information;

wherein, the channel configuration information includes: first information used to represent whether to load a scene module or not; second information used to represent a version number of the scene module that needs be loaded; and third information used to represent subboards that need to be loaded and content data that each subboard needs.

The server further includes:

an acquisition receiving unit, configured for receiving an acquisition request sent by the client; wherein, the acquisition request is used for acquiring the configuration information and the scene module corresponding to the version number in the second information; and a scene sending unit, configured for sending the configuration information and the scene module corresponding to the version number to the client.

The media sending module includes:

a uploading detection unit, configured for detecting whether the client having the video uploading permission information of the at least one client in the current channel is uploading the video or not;

a video sending unit, configured for, if the uploading detection unit detects that the client having the video uploading permission information in the at least one client in the current channel is uploading the video, sending the video to the at least one client in the current channel so as to display the video by the video display region of the scene module by the at least one client; and a picture sending unit, configured for, if the uploading detection unit detects that the client having the video uploading permission information in the at least one client in the current channel does not upload the video, sending the pictures corresponding to the current channel to the at least one client in the current channel so as to display the pictures by the video display region of the scene module by the at least one client.

The server further includes:

a vehicle detection module, configured for detecting whether the client corresponds to a vehicle or not, when a client enters into the current channel; and an appearance sending module, configured for, when the vehicle detection module detects that the client corresponds to a vehicle, sending vehicle displaying information corresponding to the client to the at least one client in the current channel so as to display vehicle displaying animations corresponding to the client in the user interaction region by means of the subboard used for displaying the vehicle in the user interaction region by the at least one client in the current channel.

The server further includes:

a gift information receiving module, configured for receiving gift giving information sent by a client in the current channel; and a gift information forwarding module, configured for forwarding the gift giving information sent by the client to the at least one client in the current channel so as to display gift animations corresponding to the client in the user interaction region by means of a subboard used for displaying gift animations in the user interaction region by the at least one client.

According to a fifth aspect of the present disclosure, a system for multi-person audio-video interaction, includes: at least one client and a server, and the at least one client is any client of the third aspect and each preferable solution in the third aspect, and the server is any server of the fourth aspect and each preferable solution in the fourth aspect.

The beneficial effects of the technical solutions provided in the present disclosure is:

the client in the team voice communication platform can load the scene module, and the scene module includes a virtual scene, a video display region and a user interaction region, and the video display region and the user interaction region are located in the virtual scene, and text information is displayed by a simulation object corresponding to the client in a user interaction region. Thus, this method solve the problem that text chat of an audience may be soon overwhelmed by speech of other audiences so as to result in failing to realizing well communication and interaction in the process of live video by means of a team voice communication platform. In addition, the method of the present disclosure achieves that every simulation object can be used to display the text information in different space position of the user interaction region and the text information can be retained a relatively long time, thereby making an audience realize well communication and interaction effect with a host or other audience in a scene environment simulated by a virtual scene.

BRIEF DESCRIPTION OF THE DRAWINGS

In order to illustrate the embodiments or existing technical solutions more clearly, a brief description of drawings that assists the description of embodiments of present disclosure or existing art will be provided below. It would be apparent that the drawings in the following description are only for some of the embodiments of the disclosure. A person having ordinary skills in the art will be able to obtain other drawings on the basis of these drawings without paying any creative work.

DETAILED DESCRIPTION OF ILLUSTRATED EMBODIMENTS

In order to make the objective, technical solution and advantages of this disclosure more clear, further description will be given in the following embodiments combined with drawings.

Figure 1:
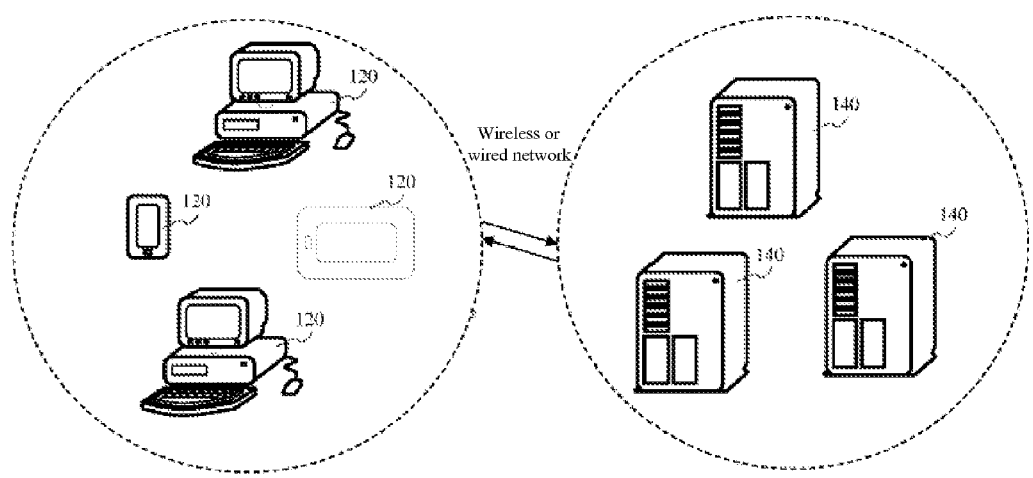
FIG. 1 is a structure diagram of a team voice communication platform involved in embodiments of the present disclosure.

Please refer to FIG. 1, FIG. 1 is a structure diagram of a team voice communication platform involved in embodiments of the present disclosure. The team voice communication platform includes at least one client 120 and at least one server 140.

In the embodiments of the present disclosure, the client 120 can be a computer, a smart phone, a tablet computer, an eBook reader or other electronic devices. The electronic device can be installed with an application client of the team voice communication platform, or installed with a browser and access a web client the team voice communication platform through the browser. According to different users, the client 120 can include: a client used by a host and a client used by an audience. Wherein, the host is a user who has the permission to upload videos and can upload the videos collected by a local camera to the server 140, and then the server 140 forwards the videos to other clients 120. The client 120 used by the audience can receive and display text, pictures, voice or videos sent by the server 140. In addition, the client used by the host is basic the same as the client used by the audience, and a team voice communication platform may include one to multiple clients, such as millions clients or ten million clients.

In the embodiments of the present disclosure, the server 140 can be connected to the client 120 through wireless network or wired network. The server 140 can be one or more servers, and can also be a cloud computing center. In other words, the server 140 can be realized by a server, and also can be realized by the combination of multiple servers, and each server performs the same or different functions, for example, a server is used for register and login, a server is used for storing head portraits of a user, a server is used for storing channel information and configuration information, a server is used for storing pictures or videos, and so on. Moreover, the server 140 can also be realized by a cloud computing center which is a virtual computing platform formed by a whole piece of service cluster.

Embodiment One

Figure 2:
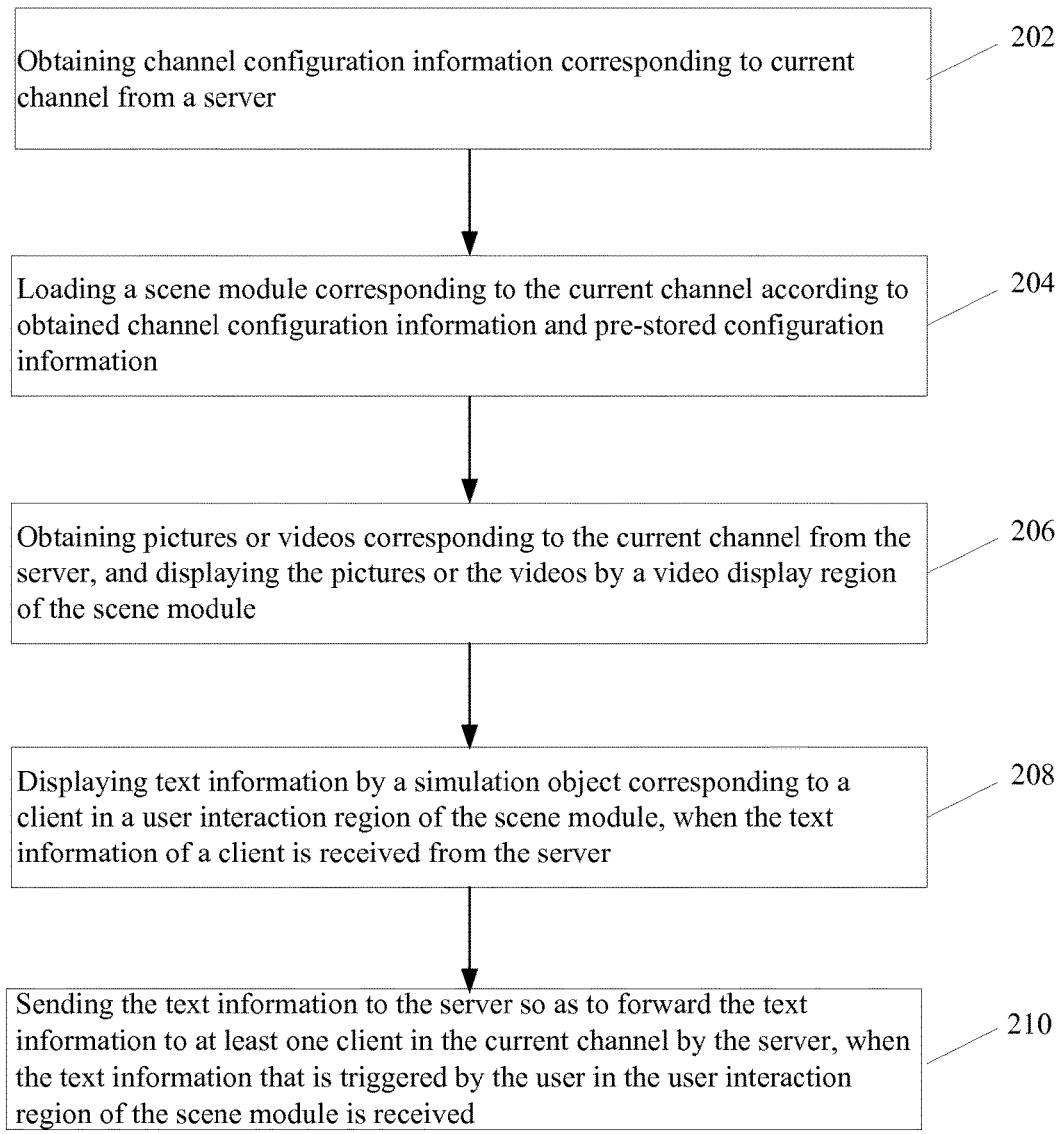
FIG. 2 is a method flowchart of a method for multi-person audio-video interaction provided by a first embodiment of the present disclosure.

Please refer to FIG. 2, FIG. 2 is a method flowchart of a method for multi-person audio-video interaction provided by a first embodiment of the present disclosure. The method for multi-person audio-video interaction in this embodiment is applied to the terminal 120 of the team voice communication platform as shown in FIG. 1, which is taken here as an example. The method for multi-person audio-video interaction at least includes:

step 202, obtaining channel configuration information corresponding to current channel from a server;

step 204, loading a scene module corresponding to the current channel according to obtained channel configuration information and pre-stored configuration information; wherein, the scene module includes a virtual scene, a video display region and a user interaction region; the video display region and the user interaction region are located in the virtual scene, and the user interaction region includes at least one simulation object, and each simulation object corresponds to one client in the current channel;

step 206, obtaining pictures or videos corresponding to the current channel from the server, and displaying the pictures or the videos by a video display region of the scene module;

step 208, displaying text information by a simulation object corresponding to the client in the user interaction region of the scene module, when the text information of a client is received from the server; and step 210, sending the text information to the server so as to forward the text information to at least one client in the current channel by the server, when the text information that is triggered by the user in the user interaction region of the scene module is received.

In summary, in the method for multi-person audio-video interaction of the present disclosure, the client in the team voice communication platform can load the scene module, and the scene module includes a virtual scene, a video display region and a user interaction region, and the video display region and the user interaction region are located in the virtual scene, and text information is displayed by a simulation object corresponding to the client in a user interaction region. Thus, this method solve the problem that text chat of an audience may be soon overwhelmed by speech of other audiences so as to result in failing to realizing well communication and interaction in the process of live video by means of a team voice communication platform. In addition, the method of the present disclosure achieves that every simulation object can be used to display the text information in different space position of the user interaction region and the text information can be retained a relatively long time, thereby making an audience realize well communication and interaction effect with a host or other audience in a scene environment simulated by a virtual scene.

Embodiment Two

Figure 3:
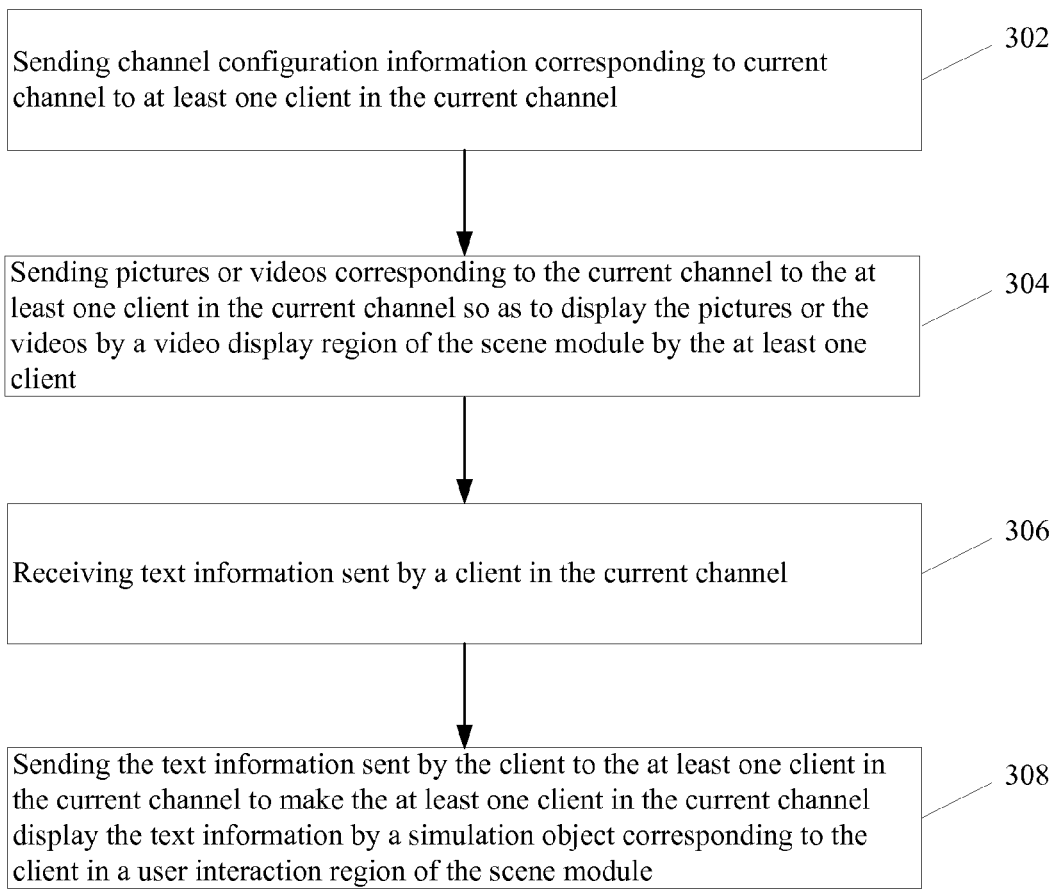
FIG. 3 is a method flowchart of a method for multi-person audio-video interaction provided by a second embodiment of the present disclosure.

Referring to FIG. 3, FIG. 3 is a method flowchart of a method for multi-person audio-video interaction provided by a second embodiment of the present disclosure. The method for multi-person audio-video interaction in this embodiment is applied to the server 140 of the team voice communication platform as shown in FIG. 1, which is taken here as an example. The method for multi-person audio-video interaction at least includes:

step 302, sending channel configuration information corresponding to current channel to at least one client in the current channel; wherein, the server sends channel configuration information corresponding to current channel to at least one client in the current channel, so that the client can load a scene module corresponding to the current channel according to obtained channel configuration information and pre-stored configuration information; the scene module includes a virtual scene, a video display region and a user interaction region; the video display region and the user interaction region are located in the virtual scene, and the user interaction region includes at least one simulation object, and each simulation object corresponds to one client in the current channel;

step 304, sending pictures or videos corresponding to the current channel to the at least one client in the current channel so as to display the pictures or the videos by a video display region of the scene module by the at least one client;

step 306, receiving text information sent by a client in the current channel; and step 308, sending the text information sent by the client to the at least one client in the current channel to make the at least one client in the current channel display the text information by a simulation object corresponding to the client in a user interaction region of the scene module.

In summary, in the method for multi-person audio-video interaction of the present disclosure, the server sends the channel configuration information to the client to make the client load the scene module, and the scene module includes a virtual scene, a video display region and a user interaction region, and the video display region and the user interaction region are located in the virtual scene, and text information is displayed by a simulation object corresponding to the client in a user interaction region. Thus, this method solve the problem that text chat of an audience may be soon overwhelmed by speech of other audiences so as to result in failing to realizing well communication and interaction in the process of live video by means of a team voice communication platform. In addition, the method of the present disclosure achieves that every simulation object can be used to display the text information in different space position of the user interaction region and the text information can be retained a relatively long time, thereby making an audience realize well communication and interaction effect with a host or other audience in a scene environment simulated by a virtual scene.

Embodiment Three

Figure 4A:
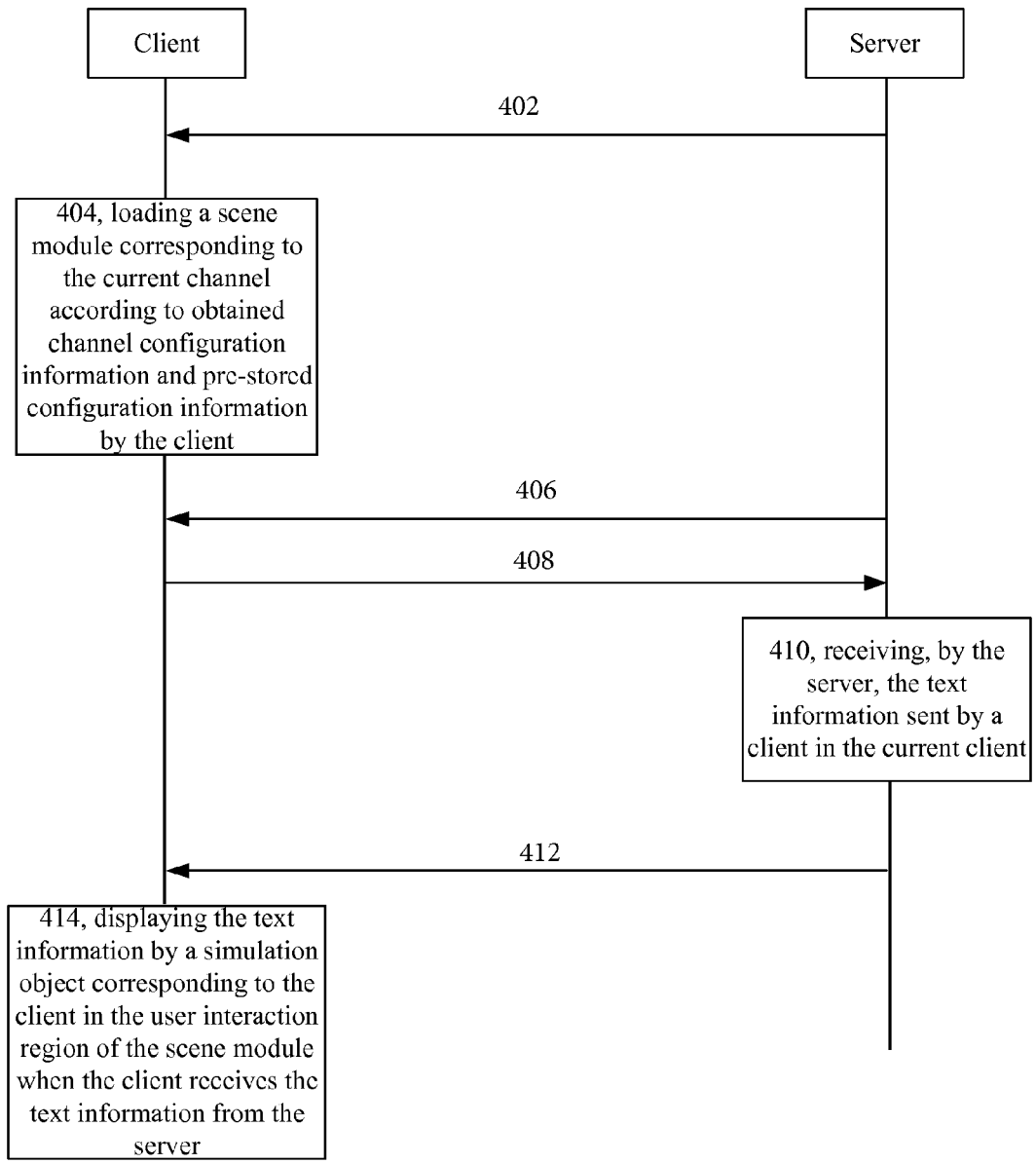
FIG. 4A is a method flowchart of a method for multi-person audio-video interaction provided by a third embodiment of the present disclosure.

Please refer to FIG. 4A, FIG. 4A is a method flowchart of a method for multi-person audio-video interaction provided by a third embodiment of the present disclosure. The method for multi-person audio-video interaction in this embodiment is applied to the team voice communication platform including at least one client and at least one server as shown in FIG. 1, which is taken here as an example. The client can be all or part of the clients located in current channel in the team voice communication platform, and the channel is a logical collection of a part of clients in the team voice communication platform. In the embodiment of the present disclosure, the method for multi-person audio-video interaction at least includes the following steps.

Step 402, sending channel configuration information corresponding to current channel to at least one client in the current channel by a server;

in detail, the client in the current channel including a first client and a second client is taken here as an example to describe the embodiment; when the first client and the second client request to access the current channel, the server can allow the first client and second client to access the current channel, and send the channel configuration information corresponding to the current channel to the first client and the second client. Correspondingly, the first client and the second client can obtain the channel configuration information corresponding to the current channel.

Figure 4B:
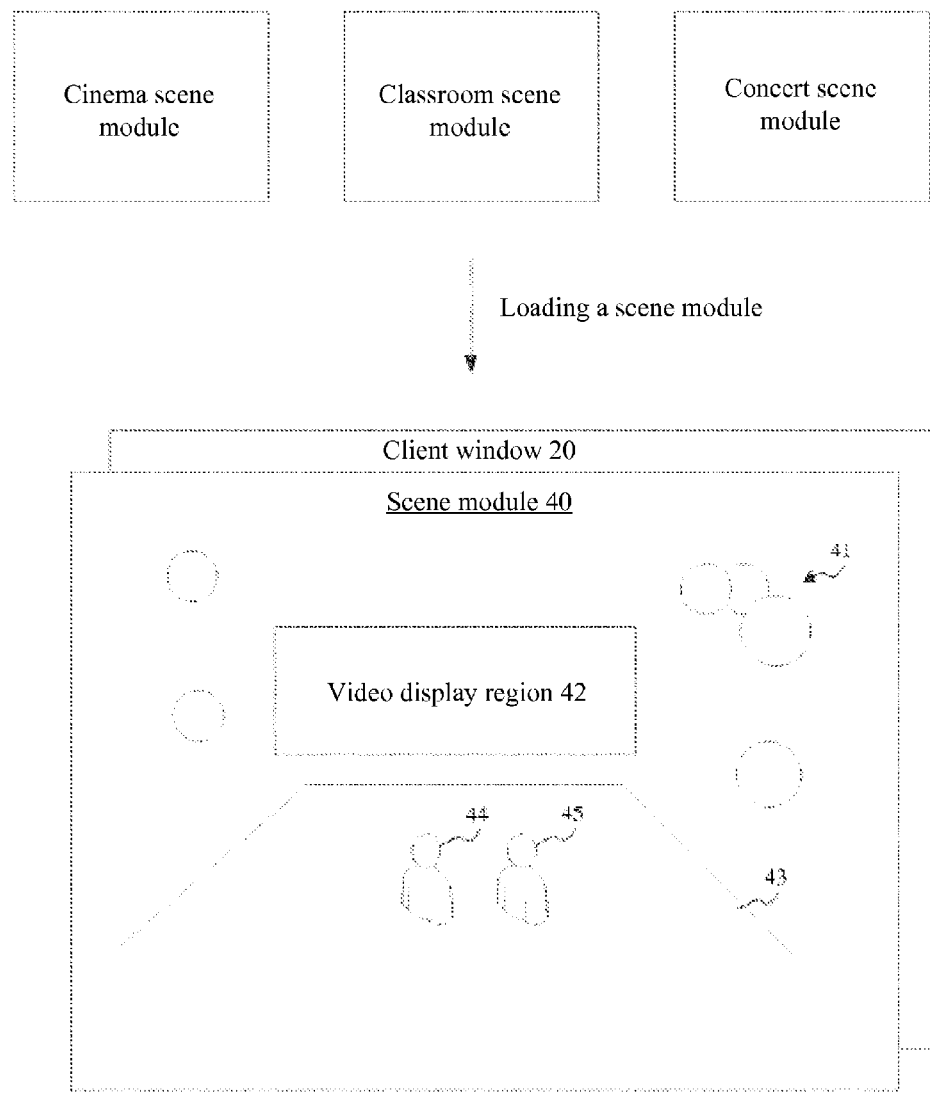
FIG. 4B is a framework diagram of a scene module provided in the third embodiment of the present disclosure.

Step 404, loading a scene module corresponding to the current channel according to obtained channel configuration information and pre-stored configuration information by the client;

in detail, the first client can load a scene module corresponding to the current channel according to obtained channel configuration information and the pre-stored configuration information, and the second client can also load a scene module corresponding to the current channel according to obtained channel configuration information and pre-stored configuration information. The scene module includes a virtual scene, a video display region and a user interaction region; the video display region and the user interaction region are located in the virtual scene, and the user interaction region includes at least one simulation object, and each simulation object corresponds to one client in the current channel. Because there are many channels in the team voice communication platform, so the scene module corresponding to each channel can be the same or different. Combined with FIG. 4B, the scene module can include a cinema scene module used for live online, a classroom scene module used for online education and a concert scene module used for online music, and so on. After the scene module 40 is loaded, the scene module 40 can be located and displayed on a client window 20 so as to make an initial display interface of the client window 20 to be replaced by a virtual scene 41, a video display region 42 and a user interaction region 43 in the scene module 40. The user interaction region 43 includes, but not limited to, at least one simulation object, for example, the user interaction region 43 includes a simulation object 44 corresponding to the first client and a simulation object 45 corresponding to the second client. In the cinema scene module, the virtual scene 41 can be a cinema, and each simulation object can be the combination of a seat and a person on the seat in the cinema. In the classroom scene module, the virtual scene 41 can be a classroom, and each simulation object can be the combination of a desk and a person corresponding to the desk in the classroom. In the concert scene module, the virtual scene 41 can be an outdoor stage, each simulation object can be the combination of a stool in front of the outdoor stage and a person on the stool, and so on, no longer list. But it should be noted that each simulation object in the user interaction region 43 can occupy different space position to facilitate well communication and interaction between the clients, also facilitate text information to be displayed for a long time.

Step 406, sending pictures or videos corresponding to the current channel to the at least one client in the current channel by the server;

in detail, the server can send pictures or videos corresponding to the current channel to the first client and the second client in the current channel. Accordingly, the first client and the second client obtain the pictures or the videos corresponding to the current channel from the server, and display the pictures or the videos by the video display region of the scene module. Wherein, the videos sent by the server can be the video uploaded by the client used by the host in the current channel, and also can be the videos of a program provided by the server itself.

Step 408, sending text information to the server by the client when the text information that is triggered by a user in a user interaction region of the scene module is received;

in detail, when the client receives the text information that is triggered by the user in the user interaction region of the scene module, the client can send the text information to the server. For example, the user who uses the first client can click the simulation object corresponding to the second client in the user interaction region resulting in popping up a text box, and input text information in the text box, and then the first client receives the text information and sends the text information to the server, so that the server forwards the text information to the second client. For another example, the user who uses the first client can input text information in a text box that is used for common chatting in the user interaction region, and then the first client receives the text information and sends the text information to the server, so that the server forwards the text information to all clients in the current channel. Understandably, when the first client sends the text information to the server, the first client can also indicate the server which client(s) is/are target client(s) of the text information.

Step 410, receiving, by the server, the text information sent by a client in the current client; wherein, the server can receive the text information sent by any client in the current client, for example, the server can receive the text information sent by the first client.

Step 412, forwarding, by the server, the text information sent by the client to at least one client in the current client; wherein, the server can forward the text information sent by the first client to at least one client in the current client, for example, the target client of the text information is the second client, and then the server can only send the text information to the second client; for another example, the target clients of the text information is all clients in the current channel, then the server can send the text information to all the clients.

Step 414, displaying the text information by a simulation object corresponding to the client in the user interaction region of the scene module when the client receives the text information from the server.

In detail, when one client receives the text information of other clients from the server, the client displays the text information by a simulation object corresponding to other clients in the user interaction region of the scene module. For example, when the first client receives the text information of the first client itself from the server, the first client displays the text information by the simulation object corresponding to the first client in the user interaction region of the scene module. For another instance, when the second client receives the text information of the first client from the server, the second client displays the text information by the simulation object 44 corresponding to the first client in the user interaction region of the scene module. Because each simulation object is located at different space position in the user interaction region, so the text information can be continued to be displayed for a long time. Moreover, since the text information is displayed by means of the simulation object corresponding to each client, thereby which has quite strong interactivity and reality; in addition, cooperated with the scene displayed by the virtual scene 41, the user can obtain immersive experience and realize more effective interaction and communication with other users.

In summary, in the method for multi-person audio-video interaction of the present disclosure, the server sends the channel configuration information to the client to make the client load the scene module, and the scene module includes a virtual scene, a video display region and a user interaction region, and the video display region and the user interaction region are located in the virtual scene, and text information is displayed by a simulation object corresponding to the client in a user interaction region. Thus, this method solve the problem that text chat of an audience may be soon overwhelmed by speech of other audiences so as to result in failing to realizing well communication and interaction in the process of live video by means of a team voice communication platform. In addition, the method of the present disclosure achieves that every simulation object can be used to display the text information in different space position of the user interaction region and the text information can be retained a relatively long time, thereby making an audience realize well communication and interaction effect with a host or other audience in a scene environment simulated by a virtual scene.

Embodiment Four

Figure 5A:
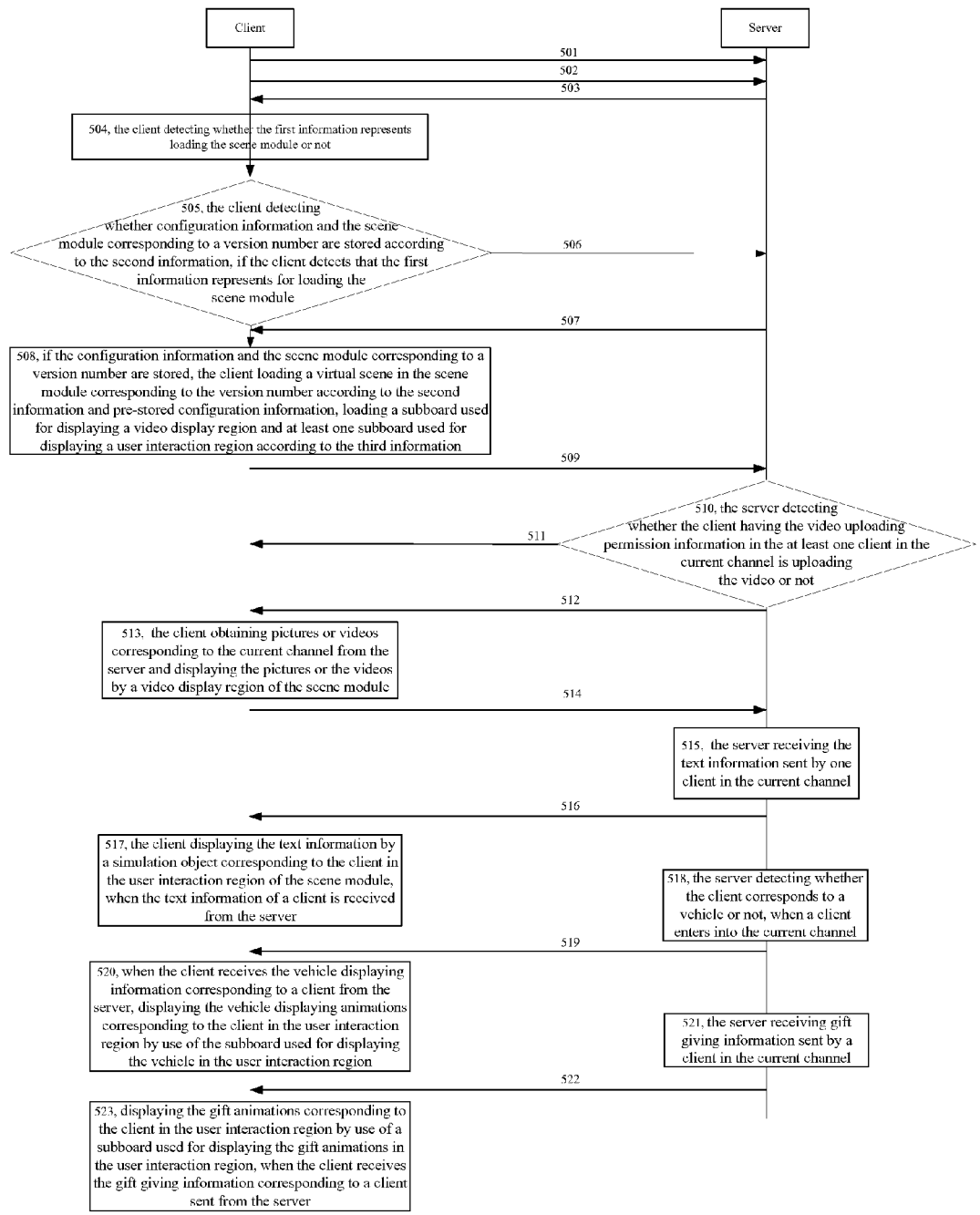
FIG. 5A is a method flowchart of a method for multi-person audio-video interaction provided by a fourth embodiment of the present disclosure.

Please refer to FIG. 5A, FIG. 5A is a method flowchart of a method for multi-person audio-video interaction provided by a fourth embodiment of the present disclosure. The method for multi-person audio-video interaction in this embodiment is applied to the team voice communication platform as shown in FIG. 1, which is still taken here as an example. Because there are quite a lot of clients in current channel, such as one million or ten millions of clients, but the number of simulation objects that can be displayed on a user interaction region is limited, so it is very necessary to divide the clients in the current channel. In this embodiment, a partition function is provided to divide the clients in the current channel. In addition to including the simulation objects corresponding to each client, the user interaction region can also include other parts used for interaction, such as a gift system, a garage system, and so on, therefore, in this embodiment, a user interaction region which includes more parts is provided for a more detailed description of this embodiment. In the embodiment of the present disclosure, the method for multi-person audio-video interaction at least includes the following steps.

Step 501, a client logining a server; wherein, first of all, the client needs to login the server by use of only identification information, the identification information can be a combination of a user name and a password. If the client does not have the identification information, the client can be registered with the server to obtain identification information.

Step 502, the client that has logged in the server sending request information to the server; wherein, the server can provide a plurality of channels for the client to enter or success, such as, a channel 1000 used for live online, a channel 2000 used for online music, a channel 3000 used for online English education, a channel 4185 used for online voice chat. Thus, the client that has logged in the server can send the request information to the server, and the request information is used to access the current channel, for example, a client that has logged in the server can send request information with a channel number to the server so as to request enter the current channel corresponding to the channel number.

It should be understood that the client can also create a channel as the current channel. At this point, the request information sent by the client is used to create the current channel, and is used to enter the current channel.

Correspondingly, the server can receive the request information sent by at least one client that has logined, and the request information is used to enter the current channel.

Step 503, the server sending channel configuration information corresponding to the current channel to the client; wherein, after receiving the request information sent by the client, the server allows the client to enter the current channel, and sends the channel configuration information corresponding to the current channel to the client. In the embodiment, the channel configuration information includes, but not limited to: first information used to represent whether to need to load a scene module or not; second information used to represent a version number of the scene module that needs be loaded; and third information used to represent subboards that need to be loaded and content data that each subboard needs. If the first information represents that the scene module does not need to be loaded, then the second information and the third information may be null. Accordingly, after the client enters the current channel, the client will obtain the channel configuration information corresponding to the current channel from the server.

Step 504, the client detecting whether the first information represents loading the scene module or not; wherein, after receiving the channel configuration information corresponding to the current channel, the client detects the first information in the channel configuration information, to determine whether to need to load a scene module.

Step 505, the client detecting whether configuration information and the scene module corresponding to a version number are stored according to the second information, if the client detects that the first information represents for loading the scene module; in detail, if, as a detection result, the client detects that the first information represents for loading the scene module, then the client, according to the second information, detects whether the configuration information and the scene module corresponding to a version number are stored; wherein, the configuration information can be stored locally, for later use many times.

Step 506, the client sending an acquisition request to the server if the configuration information and the scene module corresponding to a version number are not stored;

If, as a detection result, the client detects that the scene module corresponding to a version number and the configuration information are not stored according to the second information, then the client sends an acquisition request to the server, and the acquisition request is used for acquiring the configuration information and the scene module corresponding to a version number in the second information. For example, assuming that a detection result of the first client is the configuration information and the scene module corresponding to a version number are not stored locally, then the first client sends an acquisition request to the server, and the acquisition request is used to acquire, in the second information, the configuration information and the scene module corresponding to a version number 5.0.

Correspondingly, the server receives the acquisition request from the client, and sends the configuration information and the scene module corresponding to a version number to the client.

Step 507, the client receiving and storing the configuration information and the scene module used for acquiring a corresponding version number sent by the server;

in detail, the first client can receive and store the scene module used for acquiring a corresponding version number and the configuration information sent by the server, for this time and subsequent use.

Figure 5B:
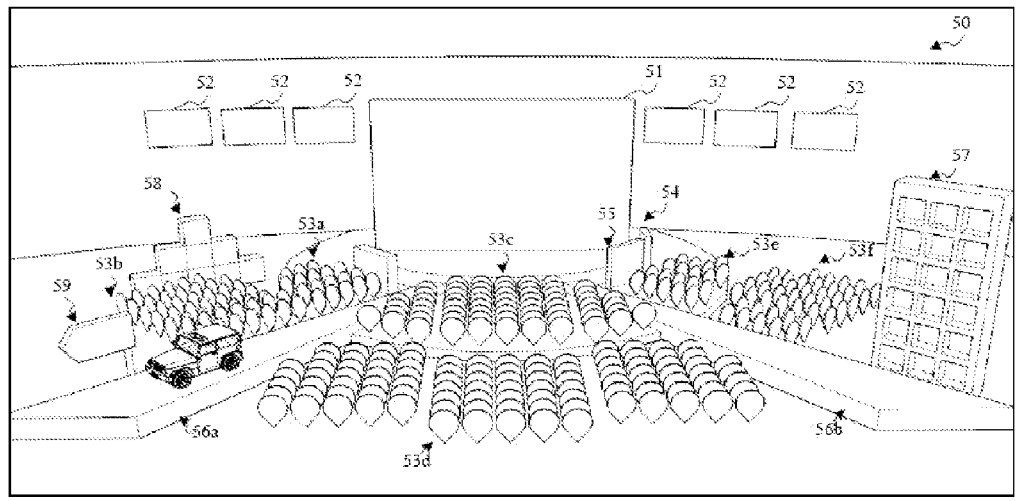
FIG. 5B is a schematic diagram of displaying a cinema scene provided in the fourth embodiment of the present disclosure.

Step 508, if it is detected that the configuration information and the scene module corresponding to a version number are stored, the client loading a virtual scene in the scene module corresponding to the version number according to the second information and pre-stored configuration information, loading a subboard used for displaying a video display region and at least one subboard used for displaying a user interaction region according to the third information;

Assuming that a detection result of the second client is the configuration information and the scene module corresponding to a version number are stored, then the second client loading a virtual scene in the scene module corresponding to the version number according to the second information and the pre-stored configuration information, wherein, the virtual scene is used for simulating a real scene, such as, a cinema, a classroom, an open-air stage, a teahouse, a theater, etc. In this embodiment of the present disclosure, a cinema module is taken here as an example to illustrate the scene module, combined with FIG. 5B, FIG. 5B is a schematic diagram of displaying a cinema scene provided in the fourth embodiment of the present disclosure; a virtual scene 50 includes a whole layout of the scene module, such as including the sky, a stage, a left-side runway 56a, a right-side runway 56, seating area 53a-3f, and so on.

Figure 5C:
FIG. 5C is a schematic diagram of displaying a simulation object provided in the fourth embodiment of the present disclosure.

Moreover, the second client can load a subboard used for displaying a video display region according to the third information. In addition, since the user interaction region can also include at least one of show information 52, a subscription list 55, a contribution list 58, a gift region 57, a vehicle region and a sharing list; the second client can also load at least one subboard used for displaying a user interaction region according to the third information, and the at least one subboard at least includes a subboard used for displaying the simulation object in the user interaction region. The simulation object includes at least one of a client picture, a client nickname and a client level, and can be a display object with a certain shape. In this embodiment of the present disclosure, a simulation object is a combination of a seat in the seating region and a picture on the seat, and the simulation object includes a client picture and a client level. In this embodiment, the client level can be divided into nobility and common, and the nobility can be divided into a king, a duke, a marquis, earl, viscount and a baron, accordingly, corresponding simulation objects can refer to FIG. 5C, FIG. 5C is a schematic diagram of displaying a simulation object provided in the fourth embodiment of the present disclosure, wherein, an external drop-shaped arc represents a seat, a middle circle represents a client picture, and the client level is displayed on the upper part of the middle circle.

The user interaction regions in different channel can include different content, that is, the content in the user interaction regions of different channels can be different from each other, and the content can be configured in the channel configuration information by the server. In the embodiment of the present disclosure, the user interaction region in the current channel includes the content as much as possible by default. At this point, the client loading at least one subboard used for displaying the user interaction region, includes:

1) loading a subboard used for displaying the simulation object in the user interaction region according to the configuration about the simulation object included in the third information;

The configuration about the simulation object can include identification information of the client, location information of the client and picture information of the client. The identification information of the client can be an ID only corresponding to the client. The location information of the client can be seat information of the client, because there may be many clients in the current channel, but the number of the simulation objects in the current channel is limited, so the user interaction region can provide partition function to divide the user interaction region into a plurality of partitions, and each partition can only show a part of simulation objects. For example, a third seating region 53c (i.e., the seating region located in the middle and on steps) and a fourth seating region 53d (i.e., the seating region located in the middle and one the steps) are current partitions, and the third seating region 53c can only display the simulation objects corresponding to VIP clients in the current partition, and the fourth seating region 53d can only display the simulation objects corresponding common clients in the current partition, and each simulation object corresponds to one client. At this point, the seat information of each client includes the partition of the client, and a seat number of the client in the partition.

The current partition is the partition where a current client is located in, but the current client can be switched to other partitions in the current channel to view each client in the other partitions. That is, a partition switch button can be provided on the top left corner of the third seat region 53c, and another partition switch button can provided on the top right corner of the fourth seat region 53d; when a partition switch button is operated and clicked by a user, the content displayed on the third seat region 53c or the fourth seat region 53d can be switched to the content of any adjacent one of a first seat region 3a, a second seat region 53b, a fifth seat region 53e and a sixth seat region 53f. The picture information of the client can include a system default picture and a user-defined picture.

In detail, under the initial circumstance, the current client can only display the system default pictures in the first seat region 53a until the sixth seat region 53f, then obtain the configuration of the simulation objects in the third seat region 53c and the fourth seat region 53d, and update the system default pictures on the corresponding seats in the third seat region 53c and the fourth seat region 53d to user-defined pictures corresponding the clients and display the user-defined pictures. But the configuration of the simulation objects in the first seat region 53a, the second seat region 53b, the fifth seat region 53e and the sixth seat region 53f is not temporarily obtained, and also not displayed. When the partition switch button on the top left corner of the third seat region 53c is clicked by a user, the current client begins to obtain the configuration of the simulation objects in the first seat region 53a, and updates display content in the third seat region 53c according to obtained configuration of the simulation objects. At this point, the display content of the third seat region 53a is switched into the display content of the first seat region 53a, by that analogy, the user can switch to any partition in the current channel to view display content in the partition. Because the current channel may include multiple partitions, so when the user switches to other partitions, and the other partitions do not correspond to them own simulation objects, by clicking a button of "back to my seat", the user can quickly switch to his own partition.

The seat information of the client can be distributed by the server, and the server can maintain proper amount of the clients in each partition in the current channel according to load balancing policy, and create a new partition if in need.

2) loading a subboard used for displaying show information in the user interaction region if the third information includes the configuration about the show information;

in detail, when the third information includes the configuration about the show information, then the client loads a subboard used for displaying the show information in the user interaction region. In this embodiment, the subboard can display the show information in six approximate rectangle regions 52 in the user interaction region, and the show information can text or pictures, and can be updated once every once in a while.

3) loading a subboard used for displaying the subscription list in the user interaction region if the third information includes the configuration about the subscription list;

in detail, when the third information includes the configuration about the subscription list, then the client loads a subboard used for displaying the subscription list in the user interaction region. In this embodiment, the subboard can display rectangular billboards 55 of the subscription list in the user interaction region, and the subscription list can include pictures of hosts or programs broadcasted on the video display region, and an option button of "notify me when being live/notify me when starting/"; the option button of "notify me when being live" corresponds to a host channel, and the option button of "notify me when starting" corresponds to an program channel. Taking the first client here as an example, when the option button of "notify me when being live" is checked, then the server can send a prompting message to the first client when a host is broadcasted in the current channel; similarly, when the option button of "notify me when starting" is checked, then the server can send a prompting message to the first client when a program is broadcasted. The subscription list 55 can also display a pull-down button, and when the pull-down button is checked, the subscription list 55 can display detailed information of all the hosts or program in the current channel.

4) loading a subboard used for displaying the contribution list in the user interaction region if the third information includes the configuration of the subscription list;

in detail, when the third information includes the configuration about the contribution list, then the client loads a subboard used for displaying the contribution list in the user interaction. In this embodiment, the subboard can display a contribution list 58 in a trapezoidal area of the user interaction region. The contribution list 58 can display the pictures of n clients which make the most contribution in the current channel during a preset time period, and sort the n clients according to contribution value. For example, the contribution list 58 can include nine rectangular grids respectively including one rectangular grid, three rectangular grids and five rectangular grids from top to bottom, and the nine rectangular grids show the picture information of nine clients respectively according to the order from top to bottom and from left to right, that is, each rectangular grid corresponds to the picture information of one client. When any picture information is clicked, the user name and the picture information of the client and the contribution value in the current channel are displayed.

5) loading a subboard used for displaying gift animations in the user interaction region if the third information includes the configuration about the gift region;

if the third information includes the configuration about the gift region, then the client loads a subboard used for displaying gift animations in the user interaction region. In this embodiment, the subboard can display a gift list 57 and gift animations, and the gift list 57 can be a cabinet including multiple grids in appearance, such as, flower gifts, lollipop gifts, love gifts, and so on. All or part of gifts can also have corresponding gift animations. In addition, the subboard can display an animation in which flowers are threw from a seat to the stage in the seating region, and the subboard can also display an animation in which a cartoon bear runs to the stage from the right-side runway 56b to send a gift.

6) loading a subboard used for displaying vehicles in the user interaction region if the third information includes the configuration about vehicle information;

in detail, when the third information includes the configuration about the vehicle information, then the client loads a subboard used for displaying vehicles in the user interaction region. In this embodiment, this subboard can display a parking lot and a vehicle displaying animation. For example, all or part of clients have virtual cars in the current channel, the subboard can display a parking lot button 59 beside the left-side runway 56a in the user interaction region. The information "P1230" displayed on the parking lot button 59 means there are 1230 cars parked in the parking lot in the current channel, and these cars are virtual cars owned by the clients in the current channel. When the parking lot button 59 is clicked, the third seating region 53c and the fourth seating region 53d can be switched to display the parking lot in which a plurality of cars are parked, and the parking lot can also have different partitions. In addition, when a client enters the current channel, the subboard can display a vehicle displaying animation in which a car runs into a cinema scene from the left-side runway 53a.

7) loading a subboard used for displaying a sharing list in the user interaction region if the third information includes the configuration about the sharing list;

in detail, when the third information includes the configuration about the sharing list, then the client loads a subboard used for displaying a sharing list in the user interaction region.

In this embodiment, the subboard can display a sharing list 54 in the user interaction region. When the sharing list 54 is clicked, text chat, activity information and other content is shared to other platforms which can include microblog, SNS, network space of IM (instant messaging) tools, and so on.

Understandably, expect for the above described content, the scene module can also include a channel information display region, a window operation region, and so on. The channel information display region can be used for displaying channel numbers, channel announcement, a name card of a host that is on wheat, and so on. The window operation region can provide different operations on the window, such as, window Zoom-in, window Zoom-out, packing up entertainment template and collection.

Step 509, if the third information includes video uploading permission information, the client sending videos to the server by use of the subboard used for displaying the video display region so as to send the videos to at least one client in the current channel by the server;

in detail, in all the clients in the current channel, a small part of clients are the clients used by the hosts. When the server sends the channel configuration information to the client used by the host, the server can configure the video uploading permission information in the third information. When the client used by the host detects that the third information includes the video uploading permission information, the client can send the videos to the server by use of the subboard used for displaying video display region, so that the server can send the videos to at least one client in the current channel. In other words, when the third information is configured with the video uploading permission information, the subboard used for displaying the video display region in the client used by the host can show some buttons in the video display region, such as, "Play", "Pause" and "Off". When the host clicks the "Play" button, corresponding control information can be sent to the server through a first channel, then the server can obtain the video uploaded by the client used by the host through a second channel, and can forward the video to at least one client in the current channel. When the host clicks the "Pause" or "Off" button, corresponding control information can be sent to the server through the first channel, then the server can pause to obtain or stop obtaining the video from the client used by the host.

Step 510, the server detecting whether the client having the video uploading permission information in the at least one client in the current channel is uploading the video or not;

in detail, the server can detect whether the client used by the host in the current channel is uploading the video or not, the client used by the host is a client with the video uploading permission information. For example, the server can detect whether to receive the control information sent by the client used by the host through the first channel, and the control information is used for controlling "Play" button, if receives the control information, then the server determines that the client used by the host is uploading the video.

Step 511, the server sending the video to the at least one client in the current channel if the client having the video uploading permission information in the at least one client in the current channel is uploading the video;

in detail, if it is detected that the client having the video uploading permission information in the at least one client in the current channel is uploading the video, the sever then sends the video to the at least one client in the current channel. In particular, the server can send the control information used for subscribing the video of the host to the at least one client in the current channel through the first channel, after receiving the control information, each client will subscribe and obtain the video uploaded by the client used by the host. In addition, the server can also send the control information used for pausing to subscribe or stopping subscribing the video of the host to the at least one client in the current channel through the first channel, after receiving the control information, each client will pause to subscribe or stop subscribing the video uploaded by the client used by the host. The at least one client can include the client used by the host, that is, the client used by the host can also subscribe and obtain the video uploaded by itself and display the video.

Step 512, the server sending pictures corresponding to the current channel to the at least one client in the current channel if the client having the video uploading permission information in the at least one client in the current channel does not upload the video;

in detail, if it is detected that the client having the video uploading permission information in the at least one client in the current channel does not upload the video, then the sever sends pictures corresponding to the current channel to the at least one client in the current channel. That is, when the client used by the host does not upload the video, the server can send the pictures corresponding to the current channel to the at least one client in the current channel. The pictures corresponding to the current channel can be pictures of the host, channel introduction pictures, etc.

Step 513, the server obtaining pictures or videos corresponding to the current channel from the server and displaying the pictures or the videos by a video display region of the scene module;

in detail, the client can obtain pictures or videos corresponding to the current channel from the server, and display the pictures or the videos by a video display region of the scene module. It should be noted that one client can obtain the videos uploaded by two or more than two hosts at the same time, for example, the client can respectively display the videos uploaded by two hosts by the video display region 51 of the scene module.

Step 514, a client sending text information to the server when the client receives the text information that is triggered by the user in the user interaction region of the scene module;

in detail, assuming that the clients in the current channel include a first client and a second client, when the second client receives the text information that is triggered by the user in the user interaction region of the scene module, then the second client can send the text information to the server. For example, the user who uses the second client can click the simulation object corresponding to the first client in the user interaction region resulting in popping up a text box, and input the text information in the text box, and then the second client receives the text information and sends the text information to the server, so that the server forwards the text information to the first client. For another example, the user who uses the second client can input the text information in a text box that is used for common chatting in the user interaction region, and then the second client receives the text information and sends the text information to the server, so that the server forwards the text information to all clients in the current channel. It should be understood that, when the second client sends the text information to the server, the second client can also indicate the server which client(s) is/are target client(s) of the text information. Specifically speaking:

if the level of the current client is nobility, then the target client receiving the text information from the current client in the form of private chat is an opposite end client during this private chat;

if the level of the current client is nobility, then the target client receiving the text information from the current client in the form of common chat is all the clients in the current channel;

if the level of the current client is common, then the target client to which the current client sends the text information in the form of private chat is an opposite end client during this private chat; and if the level of the current client is common, then the target client to which the current client sends the text information in the form of common chat is all the clients in the partition where the current client is located in the current channel.

Step 515, the server receiving the text information sent by one client in the current channel; wherein, the server can receive the text information sent by one client in the current channel, for example, the server receives the text information sent by the second client in the current channel. In addition, the server can also acquire which client(s) is/are the target client(s) of the text information.

Step 516, the server forwarding the text information sent by the client to at least one client in the current client; wherein, the server can forward the text information sent by the first client to at least one client in the current client, for example, the target client of the text information is the second client, and then the server can only send the text information to the second client; for another example, the target clients of the text information can be all clients in the current channel, then the server can send the text information to all the clients; for another example, the target clients of the text information can be all clients in a partition in the current channel, then the server can send the text information to all the client in the partition in the current channel.

Step 517, the client displaying the text information by a simulation object corresponding to the client in the user interaction region of the scene module, when the text information of a client is received from the server;

in detail, when a current client receives the text information of a client from the server, the current client displays the text information by a simulation object corresponding to the client in the user interaction region of the scene module. For example, when the first client receives the text information of the second client from the server, the first client displays the text information by the simulation object corresponding to the first client in the user interaction region of the scene module. Because each simulation object is located at different space position in the user interaction region, so the text information can be continued to be displayed for a long time. In particular, when the current client receives the text information sent from a client, the current client can display the text information, in the form of text box or animation, by the simulation object corresponding to the client in the user interaction region, and continue to display the text information for a predetermined time. For example, displaying the text information by the simulation object corresponding to the client in the form of animation is: the simulation object gets bigger and jumps up, then a text box is displayed on the simulation object, and there is corresponding information displayed in the text box; the animation can be continuously displayed n seconds, but if a mouse or a cursor hovers over the simulation object or the text box, the animation can be continuously displayed till the mouse or cursor move moves away.

It should be noted that the premise of displaying the text information is that, in the user interaction region there is a simulation object corresponding to the client that sends the text information. When there is not a simulation object corresponding to the client in the user interaction region, other ways are used to display the text information. Specifically:

if the level of the client sending the text information is nobility, and the client is not in the current partition, since the text information sent by the client whose level is nobility is visible in the current channel, then the current client can display the text information by use of the first seating region 53a, the second seating region 53b, the fifth seating region 53e or the sixth seating region 53f of the user interaction region;

if the client which sends the text information and the current client are in the same partition A, but the partition currently displayed in the user interaction region is not the partition A (that is, the current client is switched to other partitions in addition to its own partition in the current channel), then the text information is not displayed;

if the client which sends the text information is the current client, but the partition currently displayed in the user interaction region is not the partition A (that is, the current client is switched to other partitions in addition to its own partition in the current channel), then the text information is not displayed.

Step 518, the server detecting whether the client corresponds to a vehicle or not, when a client enters into the current channel; wherein, a client may enter into or exit from the current channel at any time, after a client enters into the current channel, the server detects whether the client corresponds to a vehicle or not, namely, the client has a virtual vehicle.

Step 519, the server sending vehicle displaying information corresponding to the client to at least one client in the current channel when the client corresponds to a vehicle; in detail, as a detection result, if the client corresponds to a vehicle, then the server sends the vehicle displaying information corresponding to the client to at least one client in the current channel, so that the at least one client in the current channel displays vehicle displaying animations corresponding to the client in the user interaction region by means of the subboard used for displaying the vehicle in the user interaction region.

Step 520, when the client receives the vehicle displaying information corresponding to a client from the server, the client displaying the vehicle displaying animations corresponding to the client in the user interaction region by use of the subboard used for displaying the vehicle in the user interaction region;

in detail, when the client receives the vehicle displaying information corresponding to a client from the server, then the client displays the vehicle displaying animations corresponding to the client on the left-side runway 56a of the user interaction region by use of the subboard used for displaying the vehicle in the user interaction region. For example, a client whose nickname is "Dapao" has a virtual car whose license plate number is P-8888, when the client enters into the current channel, other clients in the current channel can receive the vehicle displaying information corresponding to the client of "Dapao", and display the vehicle displaying animations corresponding to the client of "Dapao" in the user interaction region by use of the subboard used for displaying the vehicle in the user interaction region. The effect of the vehicle displaying animation can be: a car running on the left-side runway 56a from upper right to left lower, and displaying a channel notification "Dapao is driving here".

Step 521, the server receiving gift giving information sent by a client in the current channel; wherein, in the process of video broadcast, any client in the current channel can send a gift to the host, each level of the client corresponds to one kind of gift, so the gifts corresponding to different levels of clients are not identical, all or part of the gifts have corresponding gift animations. The server can receive the gift giving information sent by a client in the current channel.

Step 522, the server sending the gift giving information sent by the client to at least one client in the current channel; wherein, the server can send the gift giving information sent by one client to at least one client in the current channel, so that the at least one client can display gift animations corresponding to the client in the user interaction region by means of a subboard used for displaying gift animations in the user interaction region. The at least one client can include the client which sends the gift giving information.

Step 523, the client displaying the gift animations corresponding to the client in the user interaction region by means of a subboard used for displaying the gift animations in the user interaction region, when the client receives the gift giving information corresponding to a client sent from the server.

For example, when a current client receives the gift giving information sent by a client whose nickname is "Dimei", the gift giving information is used for giving flowers to the host, then the current displays the gift animations corresponding to the client in the user interaction region by means of a subboard used for displaying the gift animations in the user interaction region. Specifically:

if the level of the client of "Dimei" is nobility, and the current client is in the current partition, then the third seating region 53c of the current client includes a simulation object corresponding to the client of "Dimei", so the current client can display a gift animation of throwing flowers to the stage on the simulation object corresponding to the client of "Dimei" by means of the subboard;

if the level of the client of "Dimei" is nobility, and the current client is not in the current partition, then the third seating region 53c of the current client does not include the simulation object corresponding to the client of "Dimei", so the current client can display a gift animation of throwing flowers to the stage on the first seating region 53a or the fifth seating region 53e by means of the subboard, but not display the simulation object corresponding to the client of "Dimei";

if the level of the client of "Dimei" is common, and the current client is in the current partition, then the fourth seating region 53d of the current client includes a simulation object corresponding to the client of "Dimei", so the current client can display a gift animation of throwing flowers to the stage on the simulation object corresponding to the client of "Dimei" by means of the subboard;

if the level of the client of "Dimei" is common, and the current client is not in the current partition, then the fourth seating region 53d of the current client does not include the simulation object corresponding to the client of "Dimei", so the current client can display a gift animation of throwing flowers to the stage on the second seating region 53b or the sixth seating region 53f by means of the subboard, but not display the simulation object corresponding to the client of "Dimei".

For another example, when the current client receives the gift giving information sent from the client of "Dimei", the gift giving information is used for sending special gifts to the host, the current client can display a cartoon bear on the right-side runway 56b by use of the subboard, and the cartoon bear runs onto the stage with a gift box, and the gift box pops up a special gift in the form of an animation. It should be noted that animation effects of giving gifts can be different in different embodiments. For example, in some embodiments, the animation effects of giving gifts can also be changing the weather in a virtual scene, "raining", or "thunder and lightning", the present disclosure does not make specific limits to this.

In summary, in the method for multi-person audio-video interaction of the present disclosure, the server sends the channel configuration information to the client to make the client load the scene module, and the scene module includes a virtual scene, a video display region and a user interaction region, and the video display region and the user interaction region are located in the virtual scene, and text information is displayed by a simulation object corresponding to the client in a user interaction region. Thus, this method solve the problem that text chat of an audience may be soon overwhelmed by speech of other audiences so as to result in failing to realizing well communication and interaction in the process of live video by means of a team voice communication platform. In addition, the method of the present disclosure achieves that every simulation object can be used to display the text information in different space position of the user interaction region and the text information can be retained a relatively long time, thereby making an audience realize well communication and interaction effect with a host or other audience in a scene environment simulated by a virtual scene.

Embodiment Five

Figure 6:
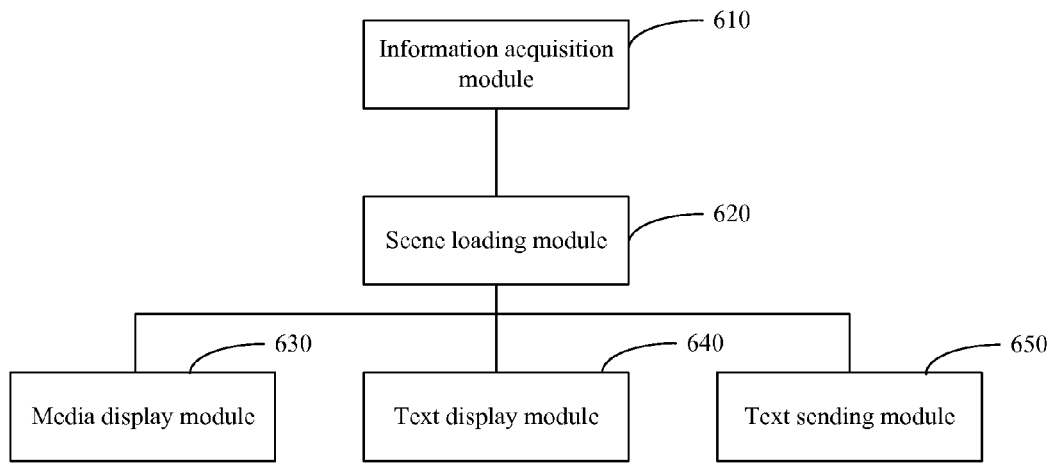
FIG. 6 is a structure diagram of a terminal provided by a fifth embodiment of the present disclosure.

Please refer to FIG. 6, FIG. 6 is a structure diagram of a terminal provided by a fifth embodiment of the present disclosure. In this embodiment, the terminal can be applied to a team voice communication platform, and includes: an information acquisition module 610, a scene loading module 620, a media display module 630, a text display module 640 and a text sending module 650.

The information acquisition module 610 is configured for obtaining channel configuration information corresponding to current channel from a server;

the scene loading module 620 is configured for loading a scene module corresponding to the current channel according to the channel configuration information obtained by the information acquisition module 610 and pre-stored configuration information; wherein, the scene module includes a virtual scene, a video display region and a user interaction region, and the video display region and the user interaction region are located in the virtual scene; the user interaction region includes at least one simulation object, and each simulation object corresponds to one client in the current channel;

the media display module 630 is configured for obtaining pictures or videos corresponding to the current channel from the server and displaying the pictures or the videos by a video display region of the scene module loaded by the scene loading module 620;

the text display module 640 is configured for displaying text information by a simulation object corresponding to the client in the user interaction region of the scene module loaded by the scene loading module 620, when the text information of a client is received from the server; and the text sending module 650 is configured for sending the text information to the server so as to forward the text information to at least one client in the current channel by the server, when the text information that is triggered by the user in the user interaction region of the scene module loaded by the scene loading module 620 is received.

Embodiment Six

Figure 7:
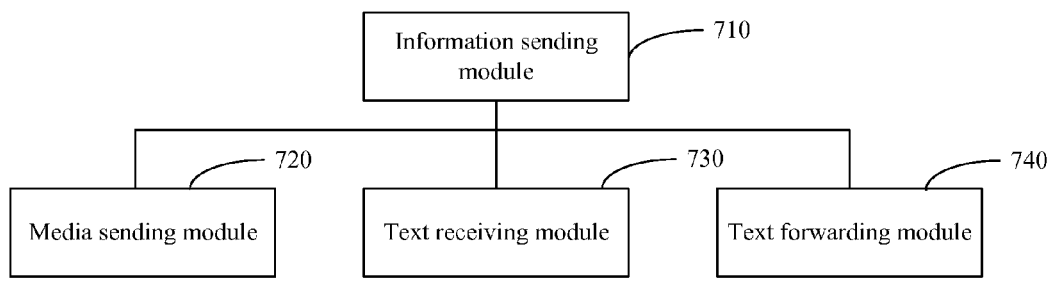
FIG. 7 is a structure diagram of a server provided by a sixth embodiment of the present disclosure.

Please refer to FIG. 7, FIG. 7 is a structure diagram of a server provided by a sixth embodiment of the present disclosure. In this embodiment, the server can be applied to a team voice communication platform, and includes: an information sending module 710, a media sending module 720, a text receiving module 730, and a text forwarding module 740.

The information sending module 710 is configured for sending channel configuration information corresponding to current channel to at least one client in the current channel so as to load a scene module corresponding to the current channel according to obtained channel configuration information and pre-stored configuration information by the client; wherein, the scene module includes a virtual scene, a video display region and a user interaction region; the video display region and the user interaction region are located in the virtual scene, and the user interaction region includes at least one simulation object, and each simulation object corresponds to one client in the current channel.

The media sending module 720 is configured for sending pictures or videos corresponding to the current channel to the at least one client in the current channel so as to display the pictures or the videos by the video display region of the scene module by the at least one client; the scene module is loaded by the client according to the channel configuration information sent from the information sending module 710.

The text receiving module 730 is configured for receiving text information sent by a client in the current channel.

The text forwarding module 740 is configured for sending the text information received by the text receiving module 730 to the at least one client in the current channel to make the at least one client in the current channel display the text information by a simulation object corresponding to the client in the user interaction region of the scene module. The scene module is loaded by the client according to the channel configuration information sent from the information sending module 710.

In summary, in the server of the present disclosure, the server sends the channel configuration information to the client to make the client load the scene module, and the scene module includes a virtual scene, a video display region and a user interaction region, and the video display region and the user interaction region are located in the virtual scene, and text information is displayed by a simulation object corresponding to the client in a user interaction region. Thus, this method solve the problem that text chat of an audience may be soon overwhelmed by speech of other audiences so as to result in failing to realizing well communication and interaction in the process of live video by means of a team voice communication platform. In addition, the method of the present disclosure achieves that every simulation object can be used to display the text information in different space position of the user interaction region and the text information can be retained a relatively long time, thereby making an audience realize well communication and interaction effect with a host or other audience in a scene environment simulated by a virtual scene.

Embodiment Seven

Figure 8:
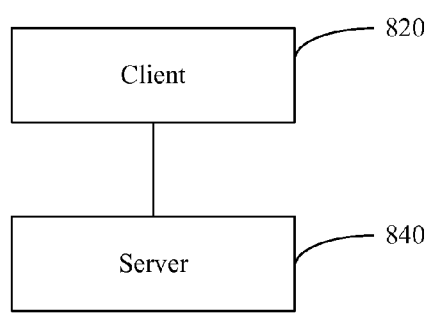
FIG. 8 is a structure diagram of a system for multi-person audio-video interaction provided by a seventh embodiment of the present disclosure.

Please refer to FIG. 8, FIG. 8 is a structure diagram of a system for multi-person audio-video interaction provided by a seventh embodiment of the present disclosure. The system for multi-person audio-video interaction can be the whole or one part of the team voice communication platform. In this embodiment of the present disclosure, the system for multi-person audio-video interaction includes: at least one client 820 and a server 840.

Each client 820 includes:

an information acquisition module, configured for obtaining channel configuration information corresponding to current channel from a server;

a scene loading module, configured for loading a scene module corresponding to the current channel according to the channel configuration information obtained by the information acquisition module and pre-stored configuration information; wherein, the scene module includes a virtual scene, a video display region and a user interaction region, and the video display region and the user interaction region are located in the virtual scene; the user interaction region includes at least one simulation object, and each simulation object corresponds to one client in the current channel;

a media display module, configured for obtaining pictures or videos corresponding to the current channel from the server and displaying the pictures or the videos by a video display region of the scene module loaded by the scene loading module;

a text display module, configured for displaying text information by a simulation object corresponding to the client in the user interaction region of the scene module loaded by the scene loading module, when the text information of a client is received from the server; and a text sending module, configured for sending the text information to the server so as to forward the text information to at least one client in the current channel by the server, when the text information that is triggered by the user in the user interaction region of the scene module loaded by the scene loading module is received.

Preferably, the channel configuration information includes, but not limited to: first information used to represent whether to need to load the scene module or not; second information used to represent a version number of the scene module that needs be loaded; and third information used to represent subboards that need to be loaded and content data that each subboard needs. The scene module includes: an information detection unit, a scene loading unit and a subboard loading unit.

The information detection unit is configured for detecting whether the first information represents loading the scene module or not;

the scene loading unit is configured for loading the virtual scene in the scene module corresponding to the version number according to the second information and the pre-stored configuration information, if the information detection unit detects that the first information represents loading the scene module;

the subboard loading unit is configured for loading a subboard used for displaying the video display region and at least one subboard used for displaying the user interaction region according to the third information if the information detection unit detects that the first information represents loading the scene module; wherein, the at least one subboard includes a subboard used for displaying the simulation object in the user interaction region.

Preferably, the scene loading module further includes: a scene detection unit, a request sending unit and a scene acquisition unit. The scene detection unit is configured for detecting whether configuration information and the scene module corresponding to a version number are stored according to the second information; the request sending unit is configured for sending an acquisition request to the server if the scene detection unit detects that the configuration information and the scene module corresponding to a version number are not stored; wherein, the acquisition request is used for acquiring the configuration information and the scene module corresponding to a version number in the second information; the scene acquisition unit is configured for receiving and storing the configuration information and the scene module used for acquiring a corresponding version number sent by the server.

Preferably, the user interaction region further includes at least one of: show information, a subscription list, a contribution list, a gift region, a vehicle region and a sharing list; the subboard loading unit is configured for:

loading a subboard used for displaying the show information in the user interaction region if the third information includes the configuration about the show information;

loading a subboard used for displaying the subscription list in the user interaction region if the third information includes the configuration about the subscription list;

loading a subboard used for displaying the contribution list in the user interaction region if the third information includes the configuration of the subscription list;

loading a subboard used for displaying gift animations in the user interaction region if the third information includes the configuration about the gift region;

loading a subboard used for displaying vehicles in the user interaction region if the third information includes the configuration about vehicle information; and loading a subboard used for displaying a sharing list in the user interaction region if the third information includes the configuration about the sharing list.

Preferably, the client further includes: an animation displaying module, and the animation displaying module is configured for, when the client receives vehicle displaying information corresponding to a client sent from the server, displaying vehicle displaying animations corresponding to the client in the user interaction region by use of the subboard used for displaying the vehicles in the user interaction region.

Preferably, the client further includes: a gift animation module, and the gift animation module is configured for displaying the gift animations corresponding to the client in the user interaction region by means of a subboard used for displaying the gift animations in the user interaction region, when the client receives the gift giving information corresponding to a client sent from the server.

Preferably, the client further includes: a video uploading module, and the video uploading module is configured for sending videos to the server by use of the subboard used for displaying the video display region so as to send the videos to the at least one client in the current channel by the server, if the third information includes video uploading permission information. Wherein, the video uploading permission information is located in content data corresponding to the subboard used for displaying the video display region in the third information.

Preferably, the simulation object includes at least one of a client picture, a client nickname and a client level, and can be a display object with a certain shape. The text display module is specially used for displaying the text information, in the form of text box or animation, by the simulation object corresponding to the client in the user interaction region, and continuing to display the text information for a predetermined time.

The server 840 includes:

an information sending module, configured for sending channel configuration information corresponding to current channel to at least one client in the current channel so as to load a scene module corresponding to the current channel according to obtained channel configuration information and pre-stored configuration information by the client; wherein, the scene module includes a virtual scene, a video display region and a user interaction region; the video display region and the user interaction region are located in the virtual scene, and the user interaction region includes at least one simulation object, and each simulation object corresponds to one client in the current channel;

a media sending module, configured for sending pictures or videos corresponding to the current channel to the at least one client in the current channel so as to display the pictures or the videos by the video display region of the scene module by the at least one client;

a text receiving module, configured for receiving text information sent by a client in the current channel; and a text forwarding module, configured for sending the text information sent by the client to the at least one client in the current channel to make the at least one client in the current channel display the text information by a simulation object corresponding to the client in the user interaction region of the scene module.

Preferably, the information sending module includes: a request receiving unit and an information sending unit; the request receiving unit is configured for receiving request information sent by at least one client that has logined, and the request information is used to enter the current channel; the information sending unit is configured for sending channel configuration information corresponding to the current channel to the client, after the request receiving unit receives the request information; wherein, the channel configuration information includes, but not limited to: first information used to represent whether to need to load a scene module or not; second information used to represent a version number of the scene module that needs be loaded; and third information used to represent subboards that need to be loaded and content data that each subboard needs.

Preferably, the server further includes: an acquisition receiving unit and a scene sending unit; the acquisition receiving unit is configured for receiving an acquisition request sent by the client; the acquisition request is used for acquiring the configuration information and the scene module corresponding to the version number in the second information; the scene sending unit is configured for sending the configuration information and the scene module corresponding to the version number to the client.

Preferably, the media sending module includes: a uploading detection unit, a video sending unit and a picture sending unit;

the uploading detection unit is configured for detecting whether the client having the video uploading permission information of the at least one client in the current channel is uploading the video or not;

the video sending unit is configured for, if the uploading detection unit detects that the client having the video uploading permission information in the at least one client in the current channel is uploading the video, sending the video to the at least one client in the current channel so as to display the video by the video display region of the scene module by the at least one client; and the picture sending unit is configured for, if the uploading detection unit detects that the client having the video uploading permission information in the at least one client in the current channel does not upload the video, sending the pictures corresponding to the current channel to the at least one client in the current channel so as to display the pictures by the video display region of the scene module by the at least one client.

Preferably, the server further includes: a vehicle detection module and an appearance sending module; the vehicle detection module is configured for detecting whether the client corresponds to a vehicle or not, when a client enters into the current channel; the appearance sending module is configured for, when the vehicle detection module detects that the client corresponds to a vehicle, sending vehicle displaying information corresponding to the client to the at least one client in the current channel so as to make the at least one client in the current channel display vehicle displaying animations corresponding to the client in the user interaction region by means of the subboard used for displaying the vehicle in the user interaction region.

Preferably, the server further includes: a gift information receiving module and a gift information forwarding module; the gift information receiving module is configured for receiving gift giving information sent by a client in the current channel; the gift information forwarding module is configured for forwarding the gift giving information sent by the client to the at least one client in the current channel so as to display gift animations corresponding to the client in the user interaction region by means of a subboard used for displaying the gift animations in the user interaction region by the at least one client.

In summary, in the system for multi-person audio-video interaction of the present disclosure, the server sends the channel configuration information to the client to make the client load the scene module, and the scene module includes a virtual scene, a video display region and a user interaction region, and the video display region and the user interaction region are located in the virtual scene, and text information is displayed by a simulation object corresponding to the client in a user interaction region. Thus, this method solve the problem that text chat of an audience may be soon overwhelmed by speech of other audiences so as to result in failing to realizing well communication and interaction in the process of live video by means of a team voice communication platform. In addition, the method of the present disclosure achieves that every simulation object can be used to display the text information in different space position of the user interaction region and the text information can be retained a relatively long time, thereby making an audience realize well communication and interaction effect with a host or other audience in a scene environment simulated by a virtual scene.

It is important to note that the system for multi-person audio-video interaction provided in above embodiment is performing the operation of audio-video interaction, only above mentioned functional modules are taken here as an example to illustrate the present disclosure. However, in a practical application, the present disclosure may include other functional modules as needed, or above described function is performed by other different functional modules which are configured for executing corresponding function, that is, the internal structure of a device (i.e., a client or a server) can be divided into different functional modules according to the need, so as to complete the above described all or part of the function. In addition, in above mentioned embodiments, the system for multi-person audio-video interaction and the method for multi-person audio-video interaction belong to the same conception, which has been described in above mentioned embodiments and need not be repeated here.

The serial number of the above mentioned embodiments in the present disclosure is just used to describe the disclosure, but not represent the merits of the embodiments. One of ordinary skill in the art will appreciate that all or part of the steps in above mentioned embodiments can be implemented and completed by corresponding hardware, and can also implemented and completed by program or instructions to control related hardware. The program can be stored in computer readable storage medium, and the above mentioned storage medium can be a read-only memory (ROM), disk or compact disc (CD), etc. While the present invention has been described with reference to particular embodiments, it will be understood that the embodiments are illustrative and that the invention scope is not so limited. Alternative embodiments of the present invention will become apparent to those having ordinary skill in the art to which the present invention pertains. Such alternate embodiments are considered to be encompassed within the spirit and scope of the present invention.

What is claimed is:

1. A method for multi-person audio-video interaction applied to a terminal of a team voice communication platform, the method, comprising:
   obtaining channel configuration information corresponding to current channel from a server;
   loading a scene module corresponding to the current channel according to obtained channel configuration information and pre-stored configuration information; wherein, the scene module comprises a virtual scene, a video display region and a user interaction region; the video display region and the user interaction region are located in the virtual scene, and the user interaction region comprises at least one simulation object, and each simulation object corresponds to one client in the current channel;
   obtaining pictures or videos corresponding to the current channel from the server, and displaying the pictures or the videos by a video display region of the scene module;
   displaying text information by a simulation object corresponding to the client in the user interaction region of the scene module, when the text information of a client is received from the server; and
   sending the text information to the server so as to forward the text information to at least one client in the current channel by the server, when the text information that is triggered by the user in the user interaction region of the scene module is received.

2. The method according to claim 1, wherein, the channel configuration information comprises: first information used to represent whether to load the scene module or not; second information used to represent a version number of the scene module that needs be loaded; and third information used to represent subboards that need to be loaded and content data that each subboard needs; the step of loading a scene module corresponding to the current channel according to obtained channel configuration information and pre-stored configuration information, comprise:
   detecting whether the first information represents loading the scene module or not;
   loading the virtual scene in the scene module corresponding to the version number according to the second information and the pre-stored configuration information, if it is detected that the first information represents loading the scene module; and
   loading a subboard used for displaying the video display region according to the third information, and loading at least one subboard used for displaying the user interaction region according to the third information; wherein, the at least one subboard comprises a subboard used for displaying the simulation object in the user interaction region.

3. The method according to claim 2, in response to loading the virtual scene in the scene module corresponding to the version number according to the second information and the pre-stored configuration information, further comprising:
   detecting whether configuration information and the scene module corresponding to the version number are stored according to the second information;
   sending an acquisition request to the server if it is detected that the configuration information and the scene module corresponding to the version number are not stored; wherein, the acquisition request is used for acquiring the configuration information and the scene module corresponding to the version number in the second information; and
   receiving and storing the configuration information and the scene module used for acquiring a corresponding version number sent by the server.

4. The method according to claim 2, wherein, the user interaction region further comprises at least one of: show information, a subscription list, a contribution list, a gift region, a vehicle region and a sharing list; the step of loading at least one subboard used for displaying the user interaction region according to the third information, comprise:
   loading a subboard used for displaying the show information in the user interaction region if the third information comprises configuration about the show information;
   loading a subboard used for displaying the subscription list in the user interaction region if the third information comprises configuration about the subscription list;
   loading a subboard used for displaying the contribution list in the user interaction region if the third information comprises configuration of the subscription list;
   loading a subboard used for displaying gift animations in the user interaction region if the third information comprises configuration about the gift region;
   loading a subboard used for displaying vehicles in the user interaction region if the third information comprises configuration about vehicle information; and
   loading a subboard used for displaying the sharing list in the user interaction region if the third information comprises configuration about the sharing list.

5. The method according to claim 4, in response to loading a subboard used for displaying vehicles in the user interaction region if the third information comprises configuration about vehicle information, further comprising:
   displaying vehicle displaying animations corresponding to the client in the user interaction region by use of the subboard used for displaying the vehicles in the user interaction region, when receives vehicle displaying information corresponding to a client sent by the server.

6. The method according to claim 4, in response to loading a subboard used for displaying gift animations in the user interaction region if the third information comprises configuration about the gift region, further comprising:
   displaying gift animations corresponding to the client in the user interaction region by means of a subboard used for displaying gift animations in the user interaction region, when receives gift giving information corresponding to a client sent by the server.

7. The method according to claim 2, in response to loading a subboard used for displaying the video display region according to the third information, further comprising:
sending videos to the server by use of the subboard used for displaying the video display region so as to send the videos to at least one client in the current channel by the server, if the third information comprises video uploading permission information; wherein, the video uploading permission information is located in content data corresponding to the subboard used for displaying the video display region in the third information.

8. The method according to claim 1, wherein, the simulation object comprises at least one of a client picture, a client nickname and a client level, and is a display object with a certain shape; wherein the step of displaying text information by a simulation object corresponding to the client in the user interaction region of the scene module comprises:
displaying the text information, in the form of text box or animation, by the simulation object corresponding to the client in the user interaction region; and
continuing to display the text information for a predetermined time.

9. A client, applied to a team voice communication platform, the client comprising:
a memory storing a plurality of program codes; and
a processor configured to execute the plurality of program codes for:
obtaining channel configuration information corresponding to current channel from a server;
load a scene module corresponding to the current channel according to the obtained channel configuration information and pre-stored configuration information; wherein, the scene module comprises a virtual scene, a video display region and a user interaction region, and the video display region and the user interaction region are located in the virtual scene; the user interaction region comprises at least one simulation object, and each simulation object corresponds to one client in the current channel;
obtaining pictures or videos corresponding to the current channel from the server and displaying the pictures or the videos by a video display region of the scene module;
displaying text information by a simulation object corresponding to the client in the user interaction region of the scene module, when the text information of a client is received from the server; and
sending the text information to the server so as to forward the text information to at least one client in the current channel by the server, when the text information that is triggered by the user in the user interaction region of the scene module is received.

10. The client according to claim 9, wherein, the channel configuration information comprises: first information used to represent whether to load the scene module or not; second information used to represent a version number of the scene module that needs be loaded; and third information used to represent subboards that need to be loaded and content data that each subboard needs; the plurality of program codes for loading a scene module corresponding to the current channel according to obtained channel configuration information and pre-stored configuration information are excuted for:

detecting whether the first information represents loading the scene module or not;
loading the virtual scene in the scene module corresponding to the version number according to the second information and the pre-stored configuration information, if it is detected that the first information represents loading the scene module; and
loading a subboard used for displaying the video display region and at least one subboard used for displaying the user interaction region according to the third information if it is detected that the first information represents loading the scene module; wherein, the at least one subboard comprises a subboard used for displaying the simulation object in the user interaction region.

11. The client according to claim 10, wherein, the plurality of program codes are further executed for:
detecting whether configuration information and the scene module corresponding to a version number are stored according to the second information;
sending an acquisition request to the server if it is detected that the configuration information and the scene module corresponding to a version number are not stored; wherein, the acquisition request is used for acquiring the configuration information and the scene module corresponding to a version number in the second information; and
configured for receiving and storing the configuration information and the scene module used for acquiring a corresponding version number sent by the server.

12. The client according to claim 10, wherein, the user interaction region further comprises at least one of: show information, a subscription list, a contribution list, a gift region, a vehicle region and a sharing list; the plurality of program codes are further executed for:
loading a subboard used for displaying the show information in the user interaction region if the third information includes the configuration about the show information;
loading a subboard used for displaying the show information in the user interaction region if the third information includes the configuration about the show information;
loading a subboard used for displaying the contribution list in the user interaction region if the third information includes the configuration of the subscription list;
loading a subboard used for displaying gift animations in the user interaction region if the third information includes the configuration about the gift region;
loading a subboard used for displaying vehicles in the user interaction region if the third information includes the configuration about vehicle information; and
loading a subboard used for displaying a sharing list in the user interaction region if the third information includes the configuration about the sharing list.

13. The client according to claim 12, wherein, the plurality of program codes are executed for, when receives vehicle displaying information corresponding to a client sent from the server, displaying vehicle displaying animations corresponding to the client in the user interaction region by use of the subboard used for displaying the vehicles in the user interaction region.

14. The client according to claim 12, wherein, the plurality of program codes are executed for displaying gift animations corresponding to the client in the user interaction region by means of a subboard used for displaying gift animations in the user interaction region, when receives gift giving information corresponding to a client sent from the server.

15. The client according to claim 10, wherein, the plurality of program codes are executed for sending videos to the server by use of the subboard used for displaying the video display region so as to send the videos to the at least one client in the current channel by the server, if the third information comprises video uploading permission information; wherein, the video uploading permission information is located in content data corresponding to the subboard used for displaying the video display region in the third information.

16. The client according to claim 9, wherein, the simulation object comprises at least one of a client picture, a client nickname and a client level, and is a display object with a certain shape; the plurality of program codes are executed for displaying the text information, in the form of text box or animation, by the simulation object corresponding to the client in the user interaction region and continuing to display the text information for a predetermined time.

17. A system for multi-person audio-video interaction, comprising: at least one client and a server,
the at least one client comprising:
a memory storing a plurality of program codes; and
a processor configured to execute the plurality of program codes for:
obtaining channel configuration information corresponding to current channel from a server;
loading a scene module corresponding to the current channel according to obtained channel configuration information and pre-stored configuration information; wherein, the scene module comprises a virtual scene, a video display region and a user interaction region, and the video display region and the user interaction region are located in the virtual scene; the user interaction region comprises at least one simulation object, and each simulation object corresponds to one client in the current channel;
obtaining pictures or videos corresponding to the current channel from the server and displaying the pictures or the videos by a video display region of the scene module;
displaying text information by a simulation object corresponding to the client in the user interaction region of the scene module loaded by the scene loading module, when the text information of a client is received from the server; and
sending the text information to the server so as to forward the text information to at least one client in the current channel by the server, when the text information that is triggered by the user in the user interaction region of the scene module; and
the server comprising:
a memory storing a plurality of program codes; and
a processor configured to execute the plurality of program codes for:
sending channel configuration information corresponding to current channel to at least one client in the current channel so as to load a scene module corresponding to the current channel according to obtained channel configuration information and pre-stored configuration information by the client; wherein, the scene module includes a virtual scene, a video display region and a user interaction region; the video display region and the user interaction region are located in the virtual scene, and the user interaction region includes at least one simulation object, and each simulation object corresponds to one client in the current channel;
sending pictures or videos corresponding to the current channel to the at least one client in the current channel so as to display the pictures or the videos by the video display region of the scene module by the at least one client;
receiving text information sent by a client in the current channel; and
sending the text information sent by the client to the at least one client in the current channel to make the at least one client in the current channel display the text information by a simulation object corresponding to the client in the user interaction region of the scene module.

18. The method according to claim 3, in response to loading a subboard used for displaying the video display region according to the third information, further comprising:
sending videos to the server by use of the subboard used for displaying the video display region so as to send the videos to at least one client in the current channel by the server, if the third information comprises video uploading permission information; wherein, the video uploading permission information is located in content data corresponding to the subboard used for displaying the video display region in the third information.

19. The client according to claim 11, wherein, the plurality of program codes are executed for sending videos to the server by use of the subboard used for displaying the video display region so as to send the videos to the at least one client in the current channel by the server, if the third information comprises video uploading permission information; wherein, the video uploading permission information is located in content data corresponding to the subboard used for displaying the video display region in the third information.

20. The system according to claim 17, wherein, the plurality of program codes are further executed for:
detecting whether configuration information and the scene module corresponding to a version number are stored according to the channel configuration information;
sending an acquisition request to the server if it is detected that the configuration information and the scene module corresponding to a version number are not stored; wherein, the acquisition request is used for acquiring the configuration information and the scene module corresponding to a version number in the channel configuration information; and
receiving and storing the configuration information and the scene module used for acquiring a corresponding version number sent by the server.

* * * * *